United States Patent [19]

Wood et al.

[11] 4,435,042

[45] Mar. 6, 1984

[54] VEHICLE MIRROR AND SUPPORT ASSEMBLY

[75] Inventors: Denis Wood, Dublin, Ireland; John F. Thomas, Jr., Holland, Mich.; Barry Dipper, Cardiff, Wales; Philip D. Stegenga; John H. Veltkamp, both of West Olive; William L. Katsma, Jenison, Mich.; Robert L. Norton, Holland, Mich.

[73] Assignee: Donnelly Mirrors, Inc., Holland, Mich.

[21] Appl. No.: 276,838

[22] Filed: Jun. 24, 1981

[51] Int. Cl.$^3$ .............................. G02B 17/00
[52] U.S. Cl. .................. 350/281; 350/278; 350/279
[58] Field of Search .............. 350/279, 280, 281; 248/475 B, 475 R, 476, 481

[56] References Cited

U.S. PATENT DOCUMENTS

| | | |
|---|---|---|
| D. 81,345 | 6/1930 | Mariani . |
| D. 84,252 | 5/1931 | Mariani . |
| D. 170,683 | 10/1953 | Fischer . |
| D. 170,684 | 10/1953 | Fischer . |
| D. 178,645 | 9/1956 | Collura . |
| D. 178,646 | 9/1956 | Collura . |
| D. 179,987 | 4/1957 | Stortz . |
| D. 188,370 | 7/1960 | Grove . |
| D. 192,633 | 4/1962 | Stortz . |
| D. 192,728 | 5/1962 | Walker . |
| D. 197,888 | 4/1964 | Jepson et al. . |
| D. 250,332 | 11/1978 | Aiga . |
| 614,503 | 11/1898 | Sackett . |
| 925,524 | 6/1909 | Steinmetz . |
| 1,252,207 | 1/1918 | Walker . |
| 1,929,201 | 10/1933 | Frohlich et al. . |
| 2,088,320 | 7/1937 | De Vries . |
| 2,457,639 | 12/1948 | Brooks . |
| 2,771,263 | 11/1956 | Boho . |
| 2,775,919 | 1/1957 | Fischer . |
| 2,823,479 | 2/1958 | Adanowski . |
| 2,940,361 | 6/1960 | Francisco . |
| 2,968,995 | 1/1961 | Holden . |
| 3,120,369 | 2/1964 | Gray, Jr. . |
| 3,131,251 | 4/1964 | Ryan . |
| 3,427,095 | 2/1969 | Dykema et al. . |
| 3,512,746 | 5/1970 | Vitaloni et al. . |
| 3,513,807 | 5/1970 | Helle . |
| 3,534,938 | 10/1970 | Jordan et al. . |
| 3,564,984 | 2/1971 | Alexander . |
| 3,589,662 | 6/1971 | Lagrange . |
| 3,601,352 | 8/1971 | Jensen et al. . |
| 3,666,225 | 5/1972 | Weinberger . |
| 3,800,449 | 4/1974 | Minatodani et al. . |
| 3,828,623 | 8/1974 | Zillner . |
| 3,869,017 | 3/1975 | Feustel et al. . |
| 3,918,799 | 11/1975 | Kurz, Jr. et al. . |
| 3,954,242 | 5/1976 | Yoda . |
| 4,012,022 | 3/1977 | Tomita . |

FOREIGN PATENT DOCUMENTS

| | | |
|---|---|---|
| 1199641 | 8/1965 | Fed. Rep. of Germany . |
| 1275394 | 8/1968 | Fed. Rep. of Germany . |
| 1780550 | 5/1970 | Fed. Rep. of Germany . |
| 2024118 | 11/1970 | Fed. Rep. of Germany . |
| 2153875 | 5/1973 | Fed. Rep. of Germany . |
| 2357543 | 9/1974 | Fed. Rep. of Germany . |
| 2414075 | 11/1974 | Fed. Rep. of Germany . |
| 2530596 | 1/1977 | Fed. Rep. of Germany . |
| 2539681 | 3/1977 | Fed. Rep. of Germany . |
| 7111507 | 11/1972 | France . |
| 7409477 | 3/1974 | France . |
| 7245225 | 7/1974 | France . |
| 7316857 | 12/1974 | France . |
| 2354219 | 10/1976 | France . |
| 7710637 | 8/1978 | France . |
| 4137 | 1/1977 | Ireland . |
| 421078 | 1/1935 | United Kingdom . |
| 742838 | 1/1956 | United Kingdom . |
| 768637 | 2/1957 | United Kingdom . |
| 1096178 | 12/1967 | United Kingdom . |

OTHER PUBLICATIONS

Federal Motor Vehicle Safety Standard No. 111, "Laboratory Procedures For: Rearview Mirrors", dated Nov. 29, 1978, U.S. Dept. of Transportation, National Highway Traffic Safety Administration, Enforcement Office of Vehicle Compliance.

George C. Knight Co. brochure entitled "Crusader—Complete View Mirrors", dated Oct. 26, 1949.

U.S. Government "Motor Vehicle Safety Standard No. 111 for Rearview Mirrors", dated Feb. 26, 1977.

EEC European Motor Vehicle Regulations 0.08.39, 2.04.05, dated Mar. 1, 1971.

*Primary Examiner*—John K. Corbin
*Assistant Examiner*—P. Dzierzynski
*Attorney, Agent, or Firm*—Price, Heneveld, Huizenga & Cooper

[57] ABSTRACT

An inside rearview mirror assembly for vehicles preferably including four parts, namely, a molded breakaway mirror support bracket, a molded mirror case, a prismatic reflective mirror element, and a rigid, molded pivot actuator for moving the case and mirror element between day and night positions for reduced glare. The support bracket has a body with an I-beam configuration in cross section and vibration reducing ribs extending between front and rear flanges adjacent a central web defining the I-beam shape. Resilient clips define grooves for receipt of a windshield mounted button over which the bracket is slid and snapped on. Resilient tension and support members are included along with at least one resilient retainer to keep the bracket on the button. The case includes a peripheral lip allowing snap-in insertion of the mirror element and flexible resilient portions which provide a biasing force urging the pivot actuator into either the day or night position. Preferably, a ball and socket joint extends between the bracket and actuator for adjustment.

71 Claims, 37 Drawing Figures

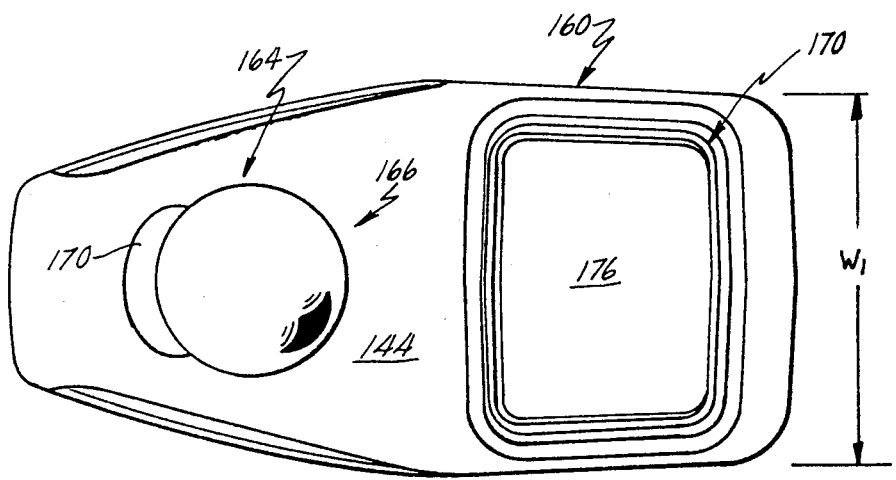
Fig. 14.
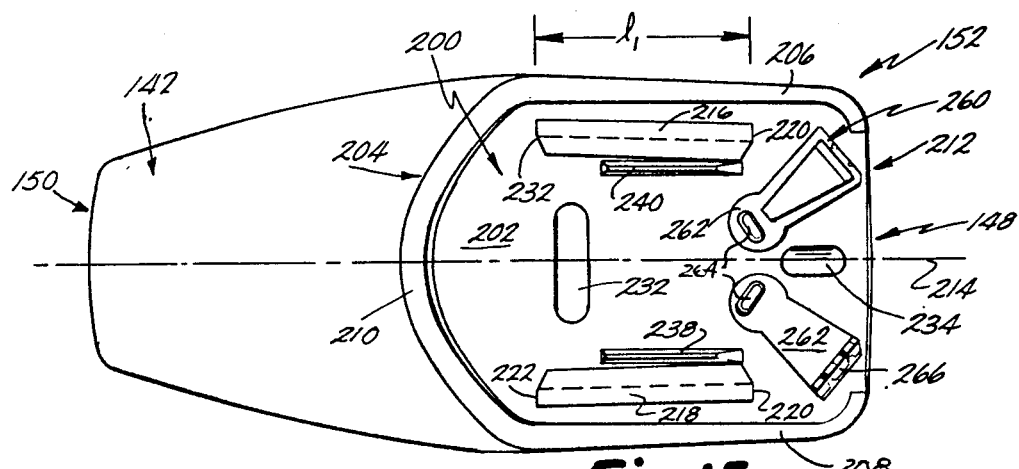
Fig. 15.
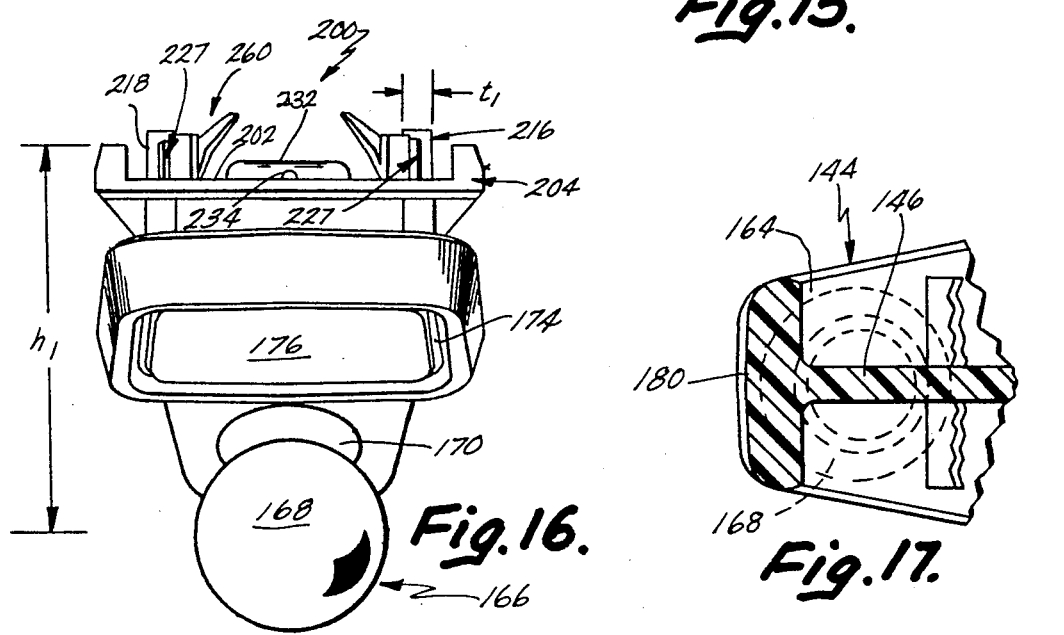
Fig. 16.
Fig. 17.

VEHICLE MIRROR AND SUPPORT ASSEMBLY

BACKGROUND OF THE INVENTION

This invention relates to interior rearview mirror assemblies for vehicles and, more particularly, to a day/night mirror assembly supported from a button secured to the interior of a vehicle windshield.

This application is related to commonly-owned, copending U.S. patent application Ser. No. 276,969, entitled VEHICLE MIRROR ASSEMBLY, and Ser. No. 276,839, entitled REARVIEW MIRROR SUPPORT BRACKET, both of which were filed on even date herewith, the disclosures of which are hereby incorporated by reference herein.

In the past, different interior day/night and other rearview mirror assemblies have been designed for different vehicles and the varying requirements of different countries in which automobiles or other vehicles are manufactured. Recent governmental and industry concern for strength, bending resistance, breakaway ability and other safety requirements, as well as manufacturing and consumer concern for weight and cost reduction in vehicles to provide energy savings, have dictated a reexamination of existing mirror assembly designs.

In the United States, not only must an inside rearview mirror provide a predetermined field of view, but it must be mounted so that it is stably supported, is both horizontally and vertically adjustable and can deflect, collapse or break away from its supported position without leaving sharp edges when subjected to a predetermined force in the forward direction within predetermined angular boundaries.

In the European Economic Community (EEC), motor vehicle regulations require that a rearview mirror assembly be able to withstand a predetermined static load including the support of a weight without breaking or, if the assembly does break, without glass fragments being released. Alternately, the mirror may be made of safety glass. These governmental regulations, together with current vehicle window areas, angles of windshield inclination, and radii of curvature place design constraints on interior rearview mirror configurations. In addition, mirror structures must be sufficiently rigid to withstand normal loads during use and must maintain proper operating characteristics throughout the full range of temperatures to which the vehicles in which the mirror assemblies are used might be exposed.

Therefore, a need was recognized for a simplified, reliable, inside day/night rearview mirror assembly for use in virtually all currently manufactured general use vehicles. It was desired to provide a mirror assembly useful in varying climatic conditions and which took into account the governmental and industry safety requirements for the major vehicle producing countries of the world. A need was further recognized for a simplified structure for retaining a mirror element within a case, for keeping manufacturing rejection rates of the assemblies to a minimum, for more positive control of the day/night pivoting action while providing fewer overall parts, for providing ease in attachment to a vehicle, consistent support in all normally encountered environments, and adequate breakaway capabilities, all while maintaining a proper field of view, strength, reduced weight and resistance to vibration during use.

SUMMARY OF THE INVENTION

Accordingly, the present invention provides a unique inside rearview mirror support bracket and mirror assembly for vehicles in which the aforementioned needs are substantially fulfilled. Preferably, the assembly is adapted for movement between day and night reflectivity positions and attachment to a mounting button which is secured directly to an interior surface of a windshield in a vehicle. The support bracket in the assembly may be slid over and snapped onto the button with the mirror head including the case, mirror element and a pivot actuator being universally ajustable with respect to the mounted bracket, preferably by means of a ball and socket joint. Should the combined elements be subjected to a predetermined force or impact such as during a collision, the assembly is adapted to break away from the mounting button and/or allow the ball on the mounting bracket to release from its receiving socket in the pivot actuator to prevent injury. The assembly avoids any possibility of column loading, thereby taking into account both current and proposed vehicle regulations.

In one aspect, the mounting bracket includes a one-piece body, preferably molded from resinous thermoplastic material, and including a pair of resilient, opposed, elongated clips which define grooves dimensioned to receive a windshield button in a tongue and groove fashion. A pivot and tension member is positioned on the rear surface of the body between the clips, the pivot and tension member being dimensioned to tension the clips after receipt of the button to securely locate the bracket on the button, and to act as a pivot or fulcrum about which the bracket rotates to break away from the button when the mirror assembly sustains a predetermined impact.

In other aspects, the bracket may have an I-beam configuration in cross section, including a central web, front flange and rear flange with the clips being formed integrally with the rear flange at the top end of the body. A series of reinforcing ribs extends between the front and back flanges to regidify and reduce vibration of the bracket. Retaining means such as hinged legs or a detent may be provided to help retain the bracket on the windshield button when mounted.

Preferably, the mirror case is formed in one piece from resinous thermoplastic material and includes flexible, resilient portions. A substantially rigid pivot actuator is mounted in the case for movement between day and night positions. The case includes a back, a continuous peripheral side wall adapted to outline the peripheral edge of the mirror element, and support means for supporting the actuator therewithin. A preformed lip on the continuous side wall retains and allos snap-in insertion of the mirror element and extends inwardly a distance sufficiently such that, when the mirror element is recieved within the case, and the actuator is pivoted, the lip will continue to cover the edge of the mirror element and a predetermined portion of the mirror element spaced inwardly from the edge thereof regardless of the flexing action of the case and lip during pivoting.

The rigid pivot actuator is preferably molded in one piece from resinous material and includes a molded socket for receiving a ball member on the bracket and multifaceted, pivot limiting, stop tabs received in apertures in support walls within the case for positive control of the pivotal case movement between day and night positions. These tabs also ease insertion of the actuator within the case. When received within the case, the pivot actuator is biased by the flexible, resilient portions of the case toward either the day or night position such that a predetermined force is required to pivot the actuator and case with the pivot means.

Accordingly, when combined, the various parts of the present invention allow adjustment to provide a proper field of view for drivers in virtually all currently manfactured general purpose vehicles. In addition, the assembly is adpated for accommodation of currrent and proposed safety regulations by breaking away and/or release of the mirror head from the bracket without sharp protrusions, all while maintaining adequate strength, minimal vibration, and reduced cost and weight.

These and other objects, advantages, purposes and features of the invention will become more apparent from a study of the following description taken in conjunction with the drawings.

BRIEF DESCRIPTION OF THE DRAWINGS

FIG. 14 is a front, plan view of the one piece mirror support bracket of the present invention;

FIG. 15 is a rear, plan view of the one-piece mirror support bracket shown in FIG. 14;

FIG. 16 is a top end elevational the one-piece mirror support bracket shown in FIGS. 14 and 15;

FIG. 17 is a fragmentary, sectional view of the bracket taken along plane XVII—XVII of FIG. 4;

DETAILED DESCRIPTION OF THE PREFERRED EMBODIMENTS

Figure 1:
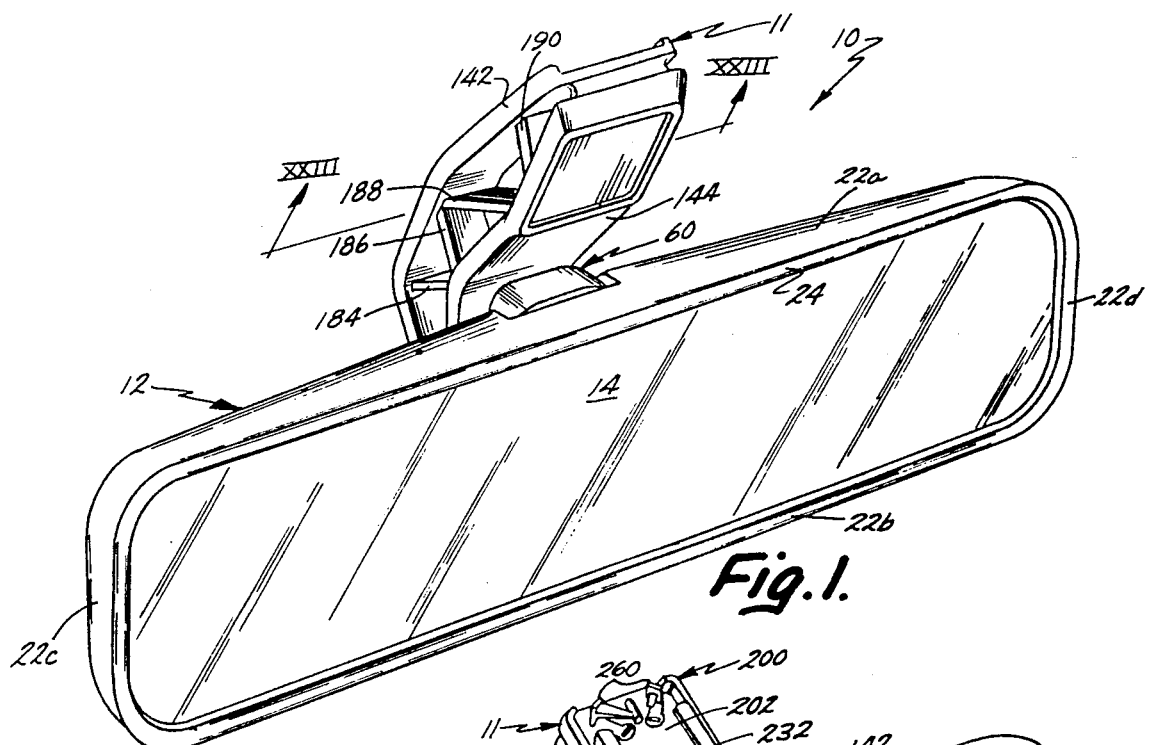
FIG. 1 is a front perspective view of the inside, day/night rearview mirror assembly of the present invention.
Figure 2:
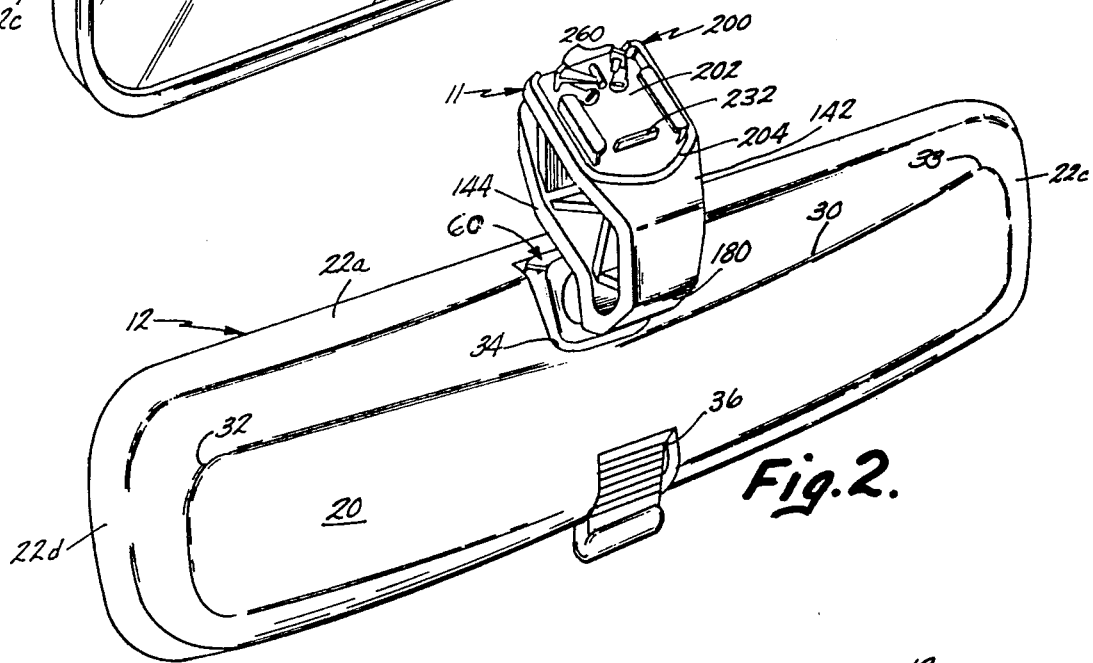
FIG. 2 is a rear view of the inside, day/night rearview mirror assembly of the present invention shown in FIG. 1.

Referring now to the drawings in greater detail, FIGS. 1 and 2 illustrate a preferred embodiment 10 of an interior, day/night rearview mirror assembly in accordance with the present invention. Mirror assembly 10 includes a one-piece, resinous support bracket 11 and a mirror case assembly including a one-piece molded, resinous mirror case 12 receiving a mirror element 14 and a one-piece, molded, resinous, rigid pivot actuator or toggle member 60. Actuator 60 is pivotally mounted in the case for movement between day and night positions as is more fully described hereinafter.

MIRROR ELEMENT

Mirror element 14 is a prism of transparent glass, plexiglass, plastic or other transparent, rigid material having a layer of reflective material 16 (FIGS. 4 and 7) placed on its rear surface. Preferably, mirror element 14 is a glass prism having a taper of 3° 35 minutes ±0° 10' and a maximum thickness of 0.218±0.015 inches. The overall element is 9.27±0.015 inches by 2.265±0.015 inches with rounded corners, slightly curved edges and a frosted, non-glare edge all around. Reflective layer 16 may be coated with a protective primer paint layer followed by a flexible, resilient polyvinyl chloride plastisol layer 18 or a covering of tape for safety reasons to prevent scattering of glass fragments should the mirror be broken.

Figure 4:
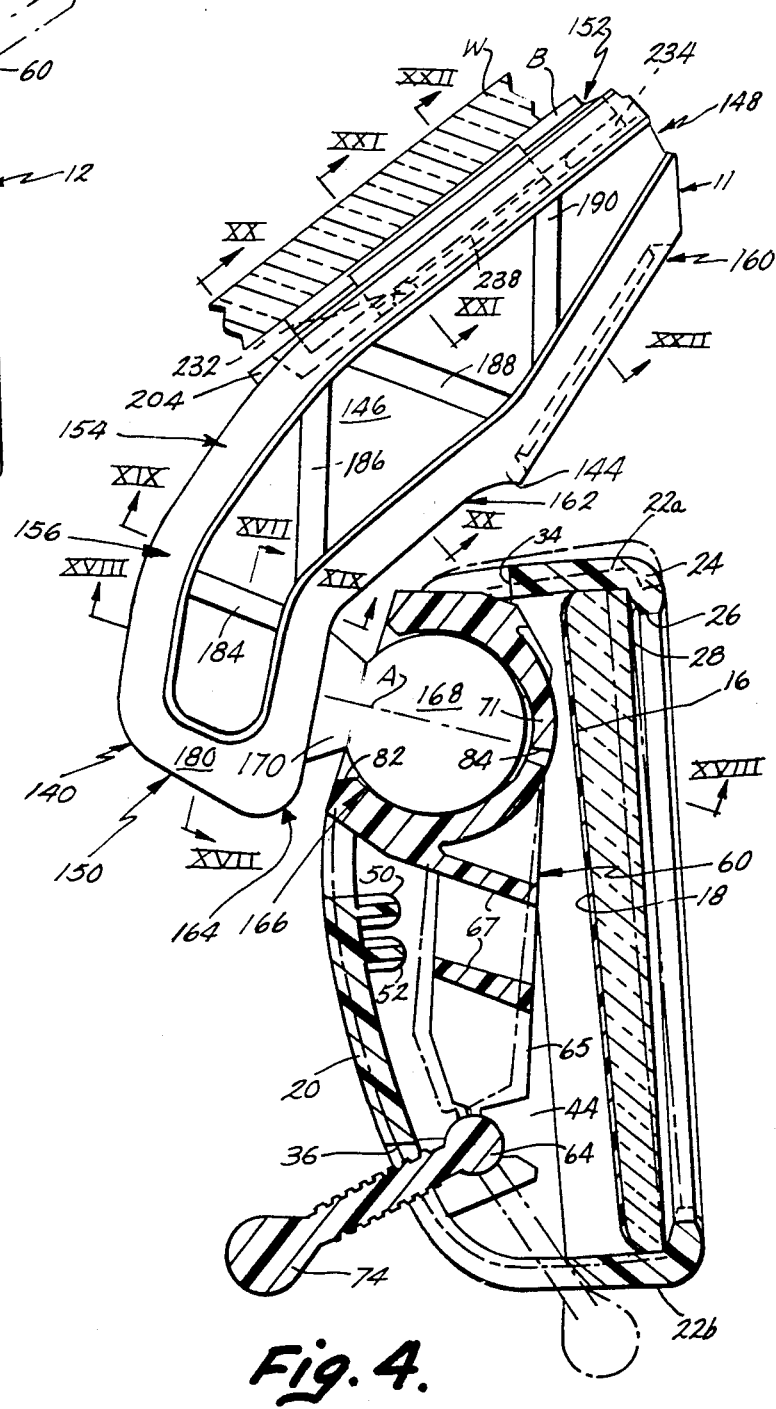
FIG. 4 is an enlarged, end elevation of the inside rearview mirror assembly of FIGS. 1-3 shown partially in section and mounted on a windshield button on the interior surface of a typical windshield.
Figure 7:
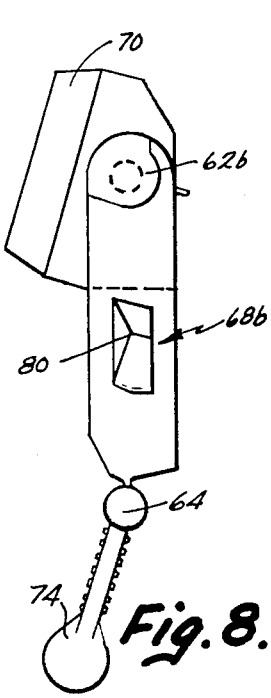
FIG. 7 is an end sectional view of the preferred mirror case and prism mirror element taken along plane VII—VII of FIG. 6.

In the preferred embodiment, layer 18 has a thickness of approximately 0.015 to 0.045 inches, which thickness tapers and becomes less adjacent the edges of the mirror element 14 (see FIGS. 4 and 7). Reflective layer 16 is normally covered with a protective layer of primer paint over which the plasticol layer 18 is applied. The primer paint is preferably a heat sensitive adhesive and includes a pigment for hiding the reflective layer on the mirror. Acceptable products include Daubond DC-8660 by Daubert Chemical Co. of Oakbrook, Ill. or product No. A 1103 B, produced by B. F. Goodrich Chemical Company, of Cleveland, Ohio. Both have adhesive bonding qualities when heated.

After application of these various layers, the mirror element and layers are cured by heating to a temperature of approximately 175°-200° F. At this approximate temperature, the PVC plastisol layer 18 is chemically converted to polyvinyl chloride. Sufficient plastisizer is originally included in the plastisol to leave the cured layer 18 inherently resilient, flexible and impressionable at all temperatures to which vehicles including such mirrors are normally subjected, namely, a range of $-40°$ F. to 190° F.

Although application of the PVC layer 18 is preferably done in plastisol form, PVC in non-plastisol form may be injection molded onto the back of the mirror. When PVC is injection molded on the mirror back, it has been found that an additional layer of bonding agent or adhesive beneath the plastisol layer, which securely bonds the plastisol layer to the mirror element, is preferred. Such suitable heat sensitive adhesive is product No. J 1199-B, produced by Armstrong Cork Company, of Cincinnati, Ohio. Other materials having the above characteristics of resiliency and flexibility over a wide temperature range, which may also be used for layer 18, include polyvinyl acetate, polyurethane and silicone sealants.

As shown in FIGS. 4 and 7, the planar front surface and planar rear surface of mirror element 14 are not parallel thereby defining the prism and enabling adjustment of the mirror assembly for day and night use to reduce the overall intensity of the light reflected from the mirror. When the assembly is pivoted for daytime use such that the actuator and case position the mirror element with incident light reflected off the coated rear surface 16 (solid lines in FIG. 4), substantially all, approximately 88 percent of the light hitting that surface will be reflected. However, when the case is pivoted for nighttime use such that light is reflected off the front, uncoated surface (phantom lines in FIG. 4), only approximately 4 percent of the incident light will be reflected. Glare in the eyes of the driver viewing the mirror is thereby reduced at night.

MIRROR CASE

Figure 5:
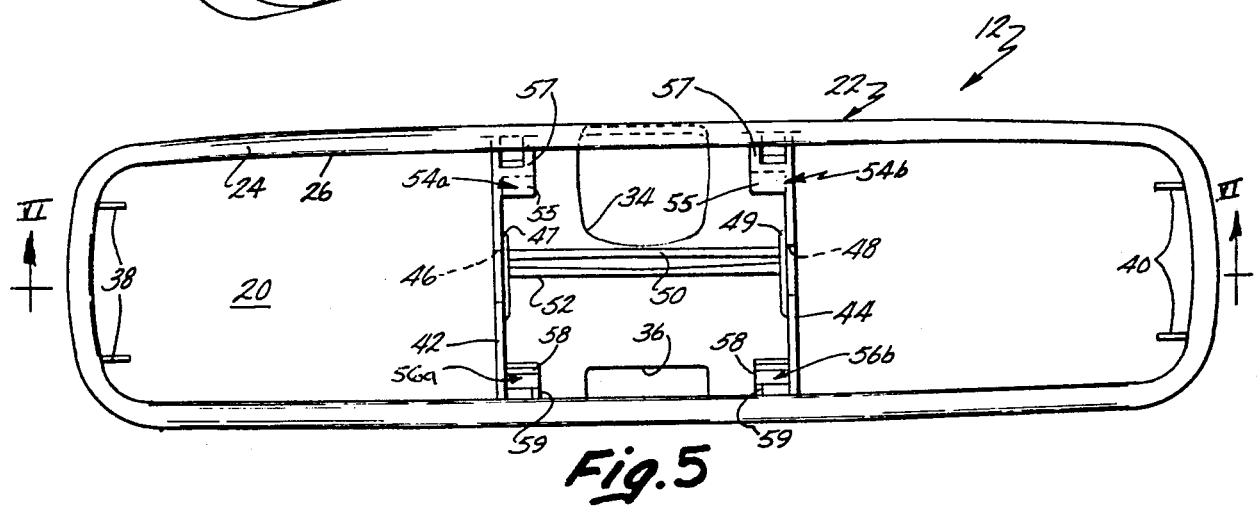
FIG. 5 is a front, plan view of the preferred, molded mirror case of the present invention.
Figure 6:
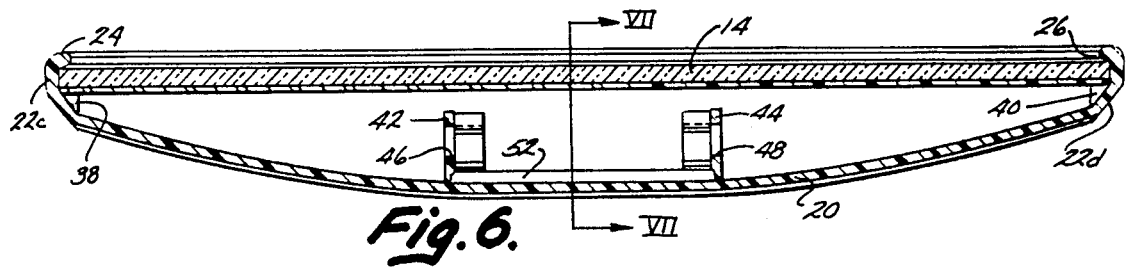
FIG. 6 is a sectional view of the preferred mirror case taken along plane VI-VI of FIG. 5, illustrating a glass mirror element mounted therein.

As is best seen in FIGS. 3-7, molded mirror case 12 includes a contoured, curved back 20 and a continuous peripheral side wall 22 which extends around the entirety of the case outlining the periphery of mirror element 14 when received therein. Side wall 22 defines top 22a, bottom 22b, and ends 22c and 22d. As shown in FIGS. 5 and 6, the thickness of the case back 20 is substantially uniform and preferably 2.5 mm while peripheral side wall 22 tapers outwardly to an increased thickness, preferably 3.0 mm, toward the front of the case where it merges with a continuous, inwardly extending, mirror element retaining lip 24. Lip 24 extends around the entirety of side wall 22 and has a curved outer shape ending at inner edge 26 and an inclined under surface 28 adapted to face the mirror element 14. Inclined surface 28 prevents the lip from catching on the corner of the glass when the case flexes. The curved outer surface of the lip 24 cooperates with the bevel 19 on the rear surface of mirror element 14 when the mirror element is snapped into the case 12 by camming the lip and peripheral side wall combination outwardly in the manner shown in FIG. 13. Lip 24 extends inwardly over the entire peripheral edge of the mirror element a predetermined distance, 2.5 mm in the preferred embodiment, and is calculated to mask any edge defects in the glass or other mirror element and also to retain the mirror element in place even when the case flexes during pivoting of the day/night pivot actuator 60 as set forth below.

As shown in FIGS. 2-4, 6 and 7, the case back curves outwardly to an area of maximum thickness approximately at the central portion of the case as defined by a contour line 30 which extends from points 32, 33 adjacent the upper corners at either end of the case downwardly in a gentle curve toward the middle of the case intermediate upper and lower corner apertures 34 and 36 but immediately adjacent the bottom portion of the uppermost aperture 34. Contour line 30 not only defines an increased depth for the overall case, but also facilitates flexure of side walls 22 when the pivot actuator is pivoted within the case and/or the mirror element 14 is snapped in place during assembly of the mirror assembly. Along with ribs 50, 52, the contour of the case also increases longitudinal bending resistance or stiffness helping to meet governmental regulations. This contour provides a somewhat bulbous shape to the mirror assembly as shown in FIGS. 3, 4, 6, 7 and 13.

Figure 12:
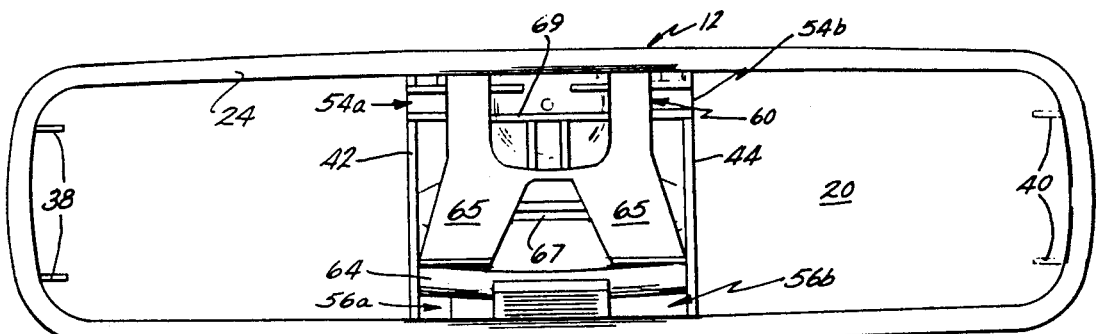
FIG. 12 is a front, plan view of the preferred case with the pivot actuator of FIGS. 8-10 mounted therein.
Figure 13:
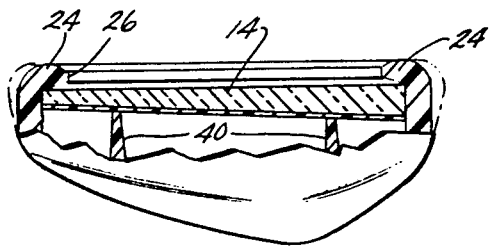
FIG. 13 is a sectional view of the preferred mirror case showing the prism mirror element supported at the ends of the case taken along plane XIII—XIII of FIG. 12.

As shown in FIGS. 5, 6, 12 and 13, mirror case 12 also includes pairs of aligned, parallel, upstanding mirror supports 38, 40 on the interior of opposite ends 22c, 22d of the case. As shown in FIG. 13, these upstanding supports extend different distances to support the varying thickness of the prismatic mirror element 14 when retained in case 12 beneath inclined surface 28 of lip 24. When snapped in place, lip 24 tightly retains the mirror element against only supports 38, 40 to prevent any vibration or movement of the mirror element within the case. The back of mirror element 14 is not supported by any other portions of the case.

As is best seen in FIGS. 4-7 and 12, the central, interior portion of case 12 includes a support area for pivot actuator or toggle member 60. The support area includes rectilinear, parallel, support walls 42, 44 each of which includes a free, rectilinear top edge which is spaced behind layer 18 of mirror element 14 when received in case 12, and is generally parallel to coated rear surface 16 as shown in FIG. 5. Each of the support walls 42, 44 includes a cutout or opening 46, 48 respectively, having nonparallel top and bottom edge surfaces which converge toward top wall 22a. Openings 46, 48 are bounded by an area of increased thickness 47, 49 on the interior surface of each wall 42, 44, respectively, to strengthen the wall around the opening. Openings 46, 48 are designed to receive the pivot limiting stop tabs 68 from pivot actuator 60 as described hereinafter. In order to strengthen the support area and case in its central section, a pair of upstanding, molded support ribs 50, 52 extend generally rectilinearly and parallel to one another but are spaced slightly apart across the area between walls 42, 44. Rib 50 is generally aligned with the contour line 30 defining the area of maximum depth of the case in the area between walls 42, 44 immediately under aperture 34.

Molded integrally and extending inwardly from the inside surfaces of support walls 42, 44 are aligned pairs of pivot supports 54a, 54b and 56a, 56b which support the top and bottom pivot axles of the pivot actuator or toggle member 60 respectively. Pivot supports 54a, 54b each include an axle support wall 55 (FIG. 7) having an inside surface contour including cylindrical surfaces of two different radii joined by a planar surface 53 designed to match the exterior contour of the upper pivot axles stubs on the pivot actuator 60. Axle support walls 55 are, in turn, supported by ribs 57 extending between the upper sides of the walls 55 and the upper side wall 22a of the case.

Similarly, lower pivot supports 56a, 56b include axle support walls 58 supported by additonal rib 59 extending between the axle support and bottom side wall portion 22b. Axle support 58 includes an inner, partially cylindrical, uniform radius surface opening generally toward an opposed, aligned one of the upper pivot supports 54a, 54b. As will be more fully described below, pivot actuator 60 is designed to be snapped in place between the sets of pivot supports 54, 56 and between support walls 42, 44 after molding of the case and prior to insertion of the mirror element 14.

PIVOT ACTUATOR

Referring now to FIGS. 4 and 8-10, a first embodiment 60 of the pivot actuator or toggle member is shown. Actuator 60 includes a pair of spaced pivot axles 62, 64 designed to be received in supports 54a and b, 56a and b, respectively, a rigid body 66 including a series of strengthening ribs or braces 67, a pair of opposed pivot limiting stop tabs 68a, 68b on opposite sides of the body 66, a mounting socket 70 extending outwardly from the upper pivot axle 62, and a pivot member including lower pivot axle 64 adapted to enable pivotal movement of the actuator between at least two positions, i.e., the forward or day and the rearward or night position when mounted within the case.

Figures 9, 10:
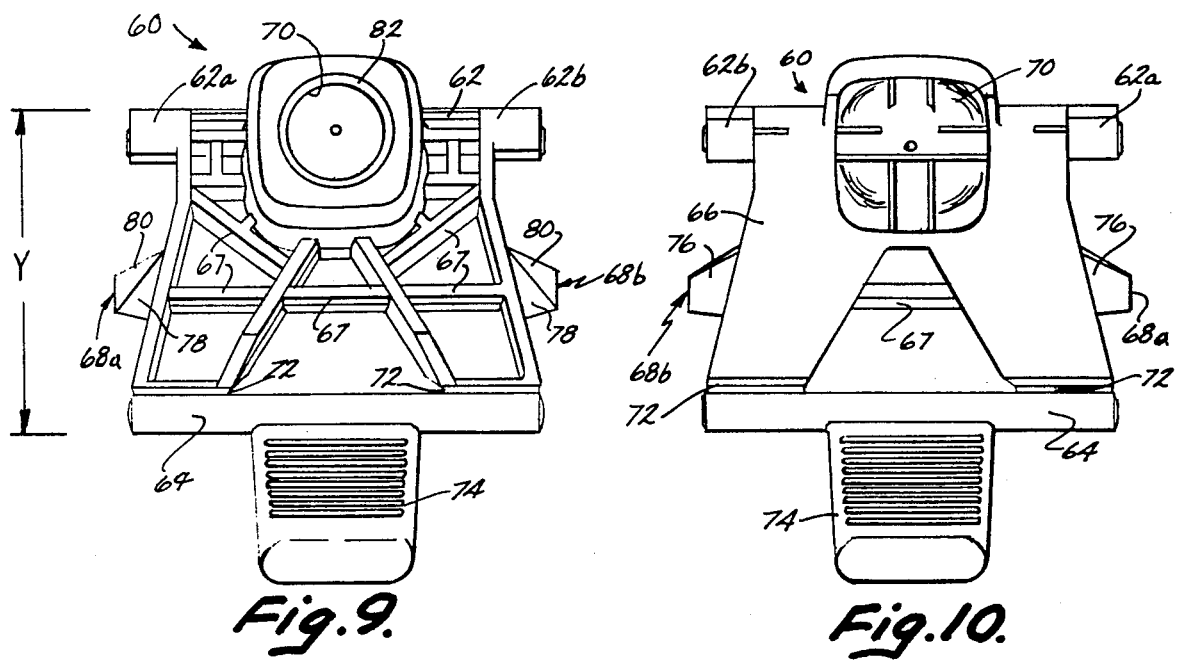
FIG. 9 is a rear view of the pivot actuator shown in FIG. 8.
FIG. 10 is a front view of the pivot actuator shown in FIGS. 8 and 9.

Upper pivot axle 62 includes a pair of stub axles 62a, 62b extending parallel to one another and in opposite directions from the upper side edges of the body 66 of actuator 60. Stub axles 62a, 62b have cylindrical surfaces of different radii joined by a planar surface in the same fashion as the inside surface of axle supports 55 on pivot supports 54a and b in case 12. The larger cylindrical surface extends approximately one third to one quarter of the way around the pivot axle, the increased radii providing the stub axle with greater strength. However, the smaller cylindrical radius portion enables the actuator to be more easily fitted in pivot supports 54a and b. Rigid body portion 66 includes a pair of diverging legs 60 which are channel-shaped in section extending between the pivot axles. These legs provide a general V-shape for the body section as best seen in FIGS. 9 and 10. The channel-shape provides weight reduction while the cross braces, such as those shown at 67 in FIGS. 4, 9 and 10, both within the side wall of each diverging leg and between legs themselves, provide significantly increased strength and rigidity for the body portion without adding significant weight. The front surfaces 65 of the diverging legs 66 lie in a common plane slightly offset from the center lines of the pivot axles 62, 64.

At the lower edges of the legs of the actuator pivot axle 64 is joined by a flexible, integrally molded living hinge 72. Projecting downwardly from the bottom of pivot axle 64 is a pivot or finger tab 74 having integral ribs molded thereon for ease in gripping. Living hinge 72, tab 74 and pivot axle 64 together form an over-center hinge assembly in combination with the rigid body 66 which operates as more fully described hereinafter.

Figures 8, 11:
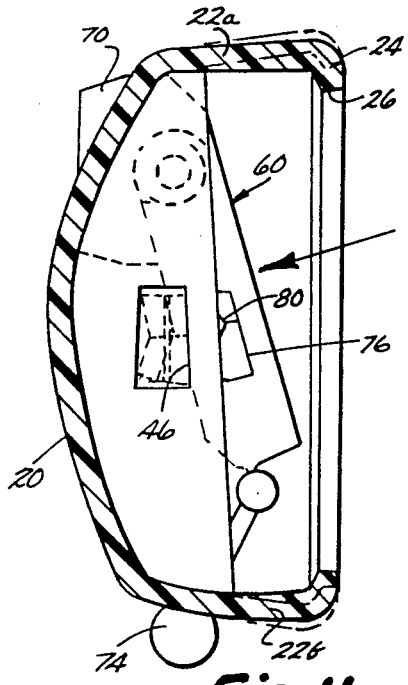
FIG. 8 is a side elevation of the preferred, rigid pivot actuator of the present invention.
FIG. 11 is an end, sectional view of the preferred mirror case during insertion of the pivot actuator of FIGS. 8-10 into the case.

Pivot limiting stop tabs 68a, 68b, which extend from the opposite side surfaces of the rigid body 66, each include multiple facets or planar surfaces intersecting one another as shown in FIGS. 4 and 8-11. Front surfaces 76 of stop tabs 68 are designed to engage the upper edge of cutout apertures 46, 48 in support walls 42, 44 to limit the pivotal movement of the actuator to its day position (FIG. 11). On the opposite side of each stop member, facets 78 provide a stop surface limiting pivotal movement of the actuator 60 to its night position (FIG. 11). Inclined facets 80 provide camming surfaces helping insertion of the actuator between the support walls 42, 44 when it is assembled within the case (FIG. 11).

As shown in FIG. 4, molded socket 70 has a central axis "A" which extends outwardly at an obtuse angle with respect to the plane of front surfaces 65 of legs 66. Socket 70 has a slightly elongated or egg shape and is not perfectly spherical such that a ball member from a support bracket does not touch socket wall 71 at all places (FIG. 9). Socket wall 71 has a substantially uniform thickness adapted to provide sufficient support for a ball member but allow insertion of such a ball without fracturing. Wall 71 is strengthened by braces 69 (FIGS. 10 and 12). Inclined, conical lead-in surface 82 facilitates snap-in insertion of a spherical ball member from mounting bracket 11 when received in the socket. Aperture 84 results from removal of a mold pin during manufacture. When received in case 12, socket 70 is adapted to project through upper corner aperture 34, while pivot tab 74 extends through lower corner aperture 36 as shown in FIG. 4.

Preferably, both case 12 and actuator 60 are molded in one piece from resinous, thermoplastic material such as a homopolymer or copolymer of polypropylene. Such material has been found to have the necessary strength and rigidity for forming the actuator 60. Yet in the configuration of the case 12, these materials have the necessary flexibility and resiliency to function as intended. Preferably, actuator 60 is molded from a homopolymer of polypropylene such as Hercules 6523 made by Hercules, Inc. of Wilmington, Del., or equivalent. Hercules 6523 has the following properties:

Flexural modulus (ASTM D790B)—250,000 psi;
Hardness (ASTM D 785A)—99 (Rockwell R scale);
Deflection temperature (ASTM D648)—212° F. (66 psi);
Notched Izod impact strength (ASTM D 256A)—0.8 ft.-lbs./in (at 73° F.)

A preferred polypropylene copolymer for case 12 is Hercules 7523 or equivalent having the following properties:

Flexural modulus (ASTM D790B)—185,000 psi;
Hardness (ASTM D785A)—80 (Rockwell R scale);
Deflection temperature (ASTM D648)—81° F. (at 66 psi);

Notched Izod impact strength (ASTM D256A)—2.5 ft.-lbs./in (at 73° F.)

CASE-ACTUATOR ASSEMBLY AND OPERATION

It has been found that the actuator, mirror element and case can best be assembled within a predetermined time period after completion of the molding of the case so as to utilize the case while its temperture remains above a predetermined level at which the case has a greater flexibility and lesser resiliency which facilitates assembly. Initially, the cylindrical surfaces of pivot supports 56a, 56b are coated with a suitable lubricant such as a grease sold as Lubriplate 930-2 by Firske Bros. Refinery, Newark, N.J. The grease provides consistency in the pivot torque for movement between day and night positions. Actuator 60 is then inserted as shown in FIG. 11 such that socket 70 projects through aperture 34 while pivot tab 74 and pivot axle 64 are rotated such that pivot tab 74 extends through lower corner aperture 36. Inclined surfaces 80 of pivot limiting stop tabs 68a, 68b are brought into engagement with the rectilinear upper edge surfaces of support walls 42, 44 while pivot stub axles 62a, 62b are being pushed into and seated within the cylindrical surfaces of pivot supports 54a, 54b all as shown in FIG. 11. Thereafter, sufficient force is applied in the direction of the arrow in FIG. 11 to force actuator 60 downwardly between support walls 42, 44 such that inclined camming surfaces 80 on the pivot limiting stop tabs 68a, 68b force walls 42, 44 to bulge outwardly allowing the pivot stop tabs to pass between them and into apertures 46, 48. Since case 12 is at an elevated temperature, the support walls 42, 44 have a greater degree of flexibility and lesser resiliency than after a longer period of cooling, thereby facilitating the above insertion process. When stop tabs 68a, 68b are received within apertures 46, 48, the lower pivot axle 64 is seated in pivot supports 56a, 56b as shown in FIG. 4.

Inasmuch as actuator 60 includes rigid body 66 which maintains a predetermined spacing between axles 62, 64, an interference fit is provided between the pivot axles of the actuator and the pivot supports of case 12 by making the distance Y (FIG. 9) between the outside surfaces of the pivot axles slightly greater than the distance X (FIG. 7), the greatest distance between the cylindrical surfaces of the pivot supports. Accordingly, when actuator 60, is snapped into place as described above, this interference, which is 0.030 inches in the preferred embodiment, flexes the side walls 22 and a portion of the case back 20 outwardly in the manner shown in phantom in FIG. 11. This provides a prestressed condition which causes the lower axle 64 to bow slightly intermediate the supports 56a, 56b as shown in FIG. 12. After the assembled case and actuator have cooled sufficiently to ambient, normal temperatures, the resiliency of the resinous, thermoplastic case material at those temperatures constantly biases the over-center pivot assembly on the actuator into one or the other of its two positions as limited by the stop tabs within apertures 46, 48. Accordingly, the case itself acts as a spring member urging the pivot actuator to either its day or night position and maintaining the actuator in that position. The preferred flip angle of movement between the day and night positions of actuator 60 is 5°29'±0°30' using the pivot limiting stop tabs 68 and apertures 46, 48.

Before the case has cooled to ambient temperatures, however, the increased flexibility and reduced resiliency of the continuous side walls 22 of the case 12 facilitates insertion of the prism mirror element 14 by snapping it into position as shown in FIG. 10. Such insertion is facilitated by bevel 19 on the rear edge corner of the mirror element camming against the rounded surface of lip 24 adjacent edge 26 such that the top, bottom and end surfaces of the case are flexed outwardly (FIG. 13). This allows inward movement of the mirror element to a position under lip 24 and against supports 38, 40. Thereafter, the continuous lip flexes inwardly from its expanded position to retain the edge of the mirror element under the lip 24.

It has been found that, with the preferred materials noted above, the insertion of both the actuator 60 and the mirror element 14 is best achieved within one to three minutes after removal of the case from the mold so as to take advantage of the greater flexibility and lesser resiliency of the case at an elevated temperature. Thereafter, the case cools to retain mirror element and actuators in position and to provide the prestressed, biasing force described above.

During use of the mirror assembly described above, it will be noted that, as shown in FIG. 4, pivotal movement of the tab 74 between its day and night position increases the distance between axles 62, 64 when tab 74 and hinges 72 are generally parallel to the front surface 65 of rigid body 66 and until the actuator is over-center toward one position or the other. Such increased distance flexes the continuous side walls and a portion of case back 20 outwardly (FIGS. 4 and 11) against the natural resiliency of the case providing a predetermined force level which must be overcome by a pivoting torque or force applied against pivot tab 74. Once such force is applied and the pivot tab is moved over center, the biasing force of the case will snap the actuator into its opposite position as limited by the surfaces on pivot limiting stop tabs 68 within apertures 46, 48. Depending on the magnitude of the interference fit between actuator 60 and supports 54, 56, and the stiffness and resiliency of the case and actuator, which can be varied by the amount of case set or cooling allowed before actuator insertion, such pivoting force will preferably be between about one and five pounds. This is sufficient to allow movement between day and night positions while providing good feel and keeping the actuator in one of its positions after movement in accord with desired design objectives. In addition, pivot limiting stop tabs 68 provide positive assurance against premature removal of the pivot actuator or toggle assembly from pivot supports 54, 56 such as could occur by a sharp force applied against the mirror assembly tending to move the pivot actuator forwardly towards the mirror element when mounted in a vehicle. The closed apertures 46, 48 which limit movement of the pivot stop tabs 68 effectively prevent such removal of the actuator after assembly.

MIRROR SUPPORT BRACKET

Referring now to FIGS. 1-4 and 14-16, bracket 11 includes a main body portion 140. Main body 140 includes a rear flange 142, a front flange 144 and a central web 146. The body has a top end 148 and a bottom end 150. As best seen in FIG. 4, bracket 12 is configured to comply with the geometric design requirements imposed upon the mirror assembly by the angle of inclination of vehicle windshields and by the radii of curvature of such windshields. Rear flange 142 includes a first, generally planar portion 152, a second portion 154 which is angled with respect to the first portion and a third portion 156. Portion 156 is angled with respect to portion 154. Portion 152 is generally planar or flat and defines a bracket attachment means which is described in detail below.

Flange 144 defines three portions including a first, planar portion 160, an intermediate portion 162 and a lower portion 164. Extending outwardly from portion 164 and formed integral therewith is a mirror case mounting means 166. Means 166 includes a spherical ball 168 formed integral with a neck 170. Neck 170 is joined centrally of flange portion 164 (FIG. 16). As seen in FIGS. 1, 4, 14 and 23, portion 160 of the front flange 144 includes an annular recess or groove 174 which defines a planar surface 176. Surface 176 is a styling-/logo area. The bracket may be "customized" to the particular vehicle manufacturer and/or special styling, logos or other trim may be added to area 176 of the bracket.

Figure 18:
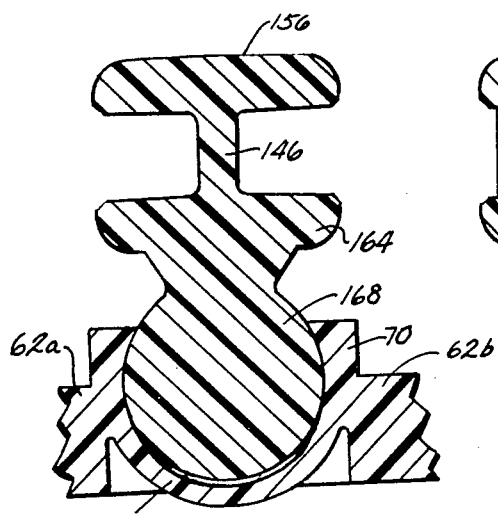
FIG. 18 is a sectional view of the bracket taken generally along plane XVIII—XVIII of FIG. 4.

As seen in FIGS. 2, 4 and 17, flanges 142, 144 at the bottom end 150 of the bracket merge in a lower end flange 180. The flanges extend outwardly, symmetrically about the planar web 146 of the main body. As seen in FIG. 18, neck 170 is integral with portion 164 of the front flange. The flanges taper inwardly from the top end of the body downwardly towards the bottom end, at which point the mirror attachment or mounting means 166 is positioned.

Figure 19:
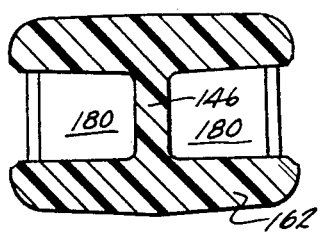
FIG. 19 is a sectional view of the bracket taken generally along plane XIX—XIX of FIG. 4.
Figure 20:
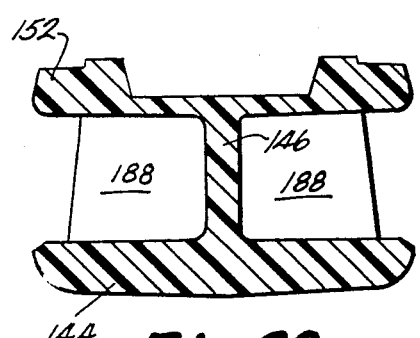
FIG. 20 is a sectional view of the bracket taken generally along plane XX—XX of FIG. 4.

The I-beam configuration of the body (FIGS. 18, 19 and 20) provides sufficient strength to the bracket and rigidity while decreasing the material needed to achieve such strength and rigidity. The I-beam configuration in cross section provides suitable vibration characteristics when coupled with the assembly of case 12, actuator 60 and mirror element 14. The mirror head assembly is thus supported within the vehicle in a stable, essentially vibration-free fashion.

It is preferred that the complete mirror head and bracket assembly, when mounted on a windshield button, have minimal image distortion due to vibration caused by road shocks to the vehicle or the like. The vibration characteristics of the bracket, in the embodiment illustrated in FIGS. 4 and 14–25, are improved by the inclusion of a plurality of angularly related ribs 184, 186, 188 and 190. The ribs are integral with and extend outwardly from central web 146 and between the inner surfaces of rear flange 142 and front flange 144. The ribs extend from both sides of the central web and the same numerical designations have been employed for the ribs on each side of the web. Rib 184 extends perpendicular to the flanges adjacent the mounting ball 168. Ribs 186, 188 are angularly related with respect to each other and are tapered inwardly with respect to each other from the front flange 144 to the rear flange 142. The ribs insure that the bracket has the rigidity required to meet the various governmental regulations and testing procedures. The material requirements for the bracket are reduced by employing the I-beam configuration and angularly related ribs.

The bracket attachment means defined by portion 152 of rear flange 142 is adapted to receive a button "B" (FIGS. 4, 21 and 22) which is mounted to the windshield "W" of a vehicle. Typical buttons have a generally trapezoidal configuration and longitudinally extending, inwardly directed sides. The button is secured to the windshield by a suitable adhesive in a conventional and known fashion.

Portion 152 of the bracket, as seen in FIGS. 2, 15 and 16, defines a recessed area 200 having a planar floor, area or surface 202. Area 202 is surrounded on three sides by a wall 204. Wall 204 includes sides 206, 208 and a base or bottom wall 210 (FIG. 15). Surrounding wall 204 is open at its upper end 212 for receipt of mounting button "B", as described below.

Positioned symmetrically about a longitudinal centerline 214 (FIG. 15) of floor 202 are opposed clips 216, 218. Clips 216, 218 are spaced apart closer adjacent their forward ends 220 than adjacent their rearward ends 222. The clips have a configuration which is the negative of the side taper of button "B" which is attached to the windshield.

Figure 22:
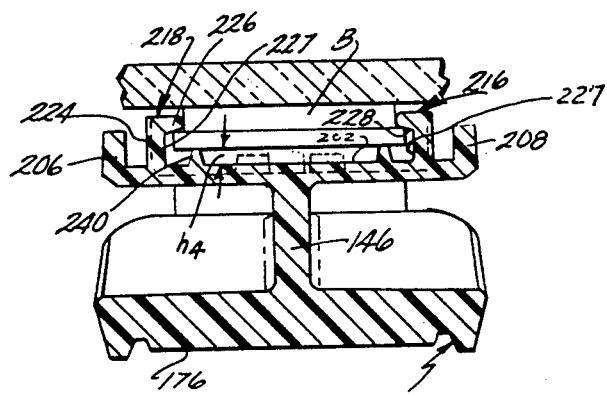
FIG. 22 is a sectional view of the bracket taken generally along plane XXII—XXII of FIG. 4.
Figure 23:
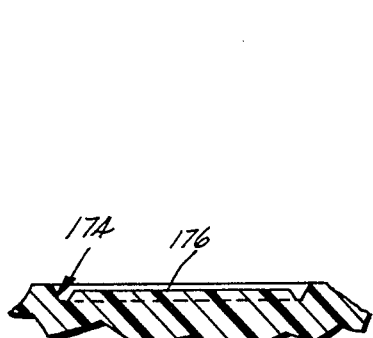
FIG. 23 is a fragmentary, sectional view of the bracket taken generally along plane XXIII—XXIII of FIG. 1.

As seen in FIG. 22, each clip 216, 218 is generally channel-shaped in cross section and includes an upstanding or sidewall 224 and an inwardly directed lip 226. The clips define opposed, inwardly facing grooves 227 (FIGS. 16 and 22). A lower or under surface 228 of each lip 226 is angled downwardly towards floor 202. The clips clamp the bracket to the windshield button.

The clips are configured and formed from a suitable resilient material to prevent vibration of the mirror yet withstand all reasonable loads expected to be encountered in normal use. The clips also permit removal or breakaway action of the bracket from the button when the bracket is impacted with a predetermined load. The slope of the undersurface 228, which in a presently existing embodiment is 15° downwardly from horizontal, facilitates ejection or separation of the bracket from the button.

Figure 21:
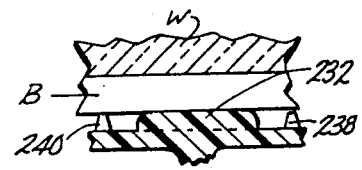
FIG. 21 is a fragmentary, sectional view of the bracket taken generally along plane XXI—XXI of FIG. 4.

As seen in FIGS. 4, 15 and 21, a pivot and tension support member 232 extends transversely and symmetrically about centerline 214 between the surrounding walls 206, 208. Member 232 is positioned adjacent the lower ends 222 of clips 216, 218. Support member 232 has an oblong half-cylindrical configuration.

Adjacent the upper end of floor 202 is a tension support member 234 (FIGS. 4 and 15). Tension support member 234 also has an oblong, half-cylindrical configuration. Member 234, however, extends longitudinally along centerline 214 and is at right angles to the pivot and tension support member 232. Member 232, as explained below, applies a tension to clips 216, 218 when the button is slid into opposed grooves 227 defined by the clips. In the event that the mirror sustains an impact, member 232 acts as a pivot or fulcrum about which the bracket rotates causing the bracket and mirror assembly to break away from the mounting button. The tension support 234 engages the support button "B" applying a tension to the clips. Members 232, 234, therefore, secure the bracket to the button. The main body configuration and the location of the attachment means prevent so-called "column loading" of the assembly. A moment arm will always exist between an impact force and the pivot point defined by member 232.

As seen in FIGS. 15 and 22, bracket attachment means 152 includes a pair of longitudinally extending, elongated, opposed V-shaped guides or bars 238, 240. The guides prevent the leading or loading edge of the button from catching on floor 202 of the bracket attachment means. These members extend upwardly from the floor and facilitate assembly of the bracket onto the button.

The embodiment illustrated in FIGS. 1, 2, 4 and 14–16 is adapted for loading onto the button from the bottom edge of the button. This permits the bracket to be used in vehicles where the windshield button must be positioned relatively close to the vehicle header. Such positioning would make loading from above difficult. The surrounding wall 204, and particularly its bottom or back wall portion 210, limits the upward movement of the bracket and attachment means onto the button.

Figure 24:
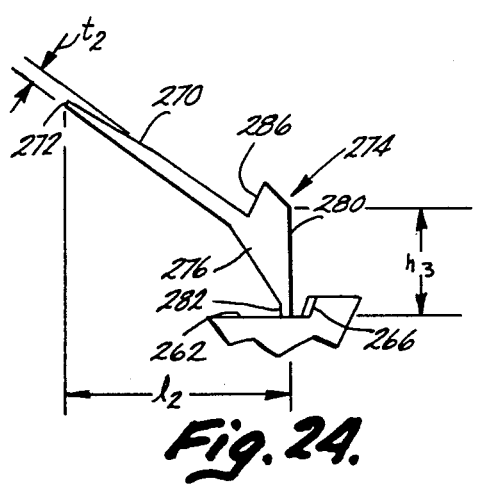
FIG. 24 is a side elevation of a resilient, retaining leg incorporated in the bracket shown in FIGS. 14-23.
Figure 25:
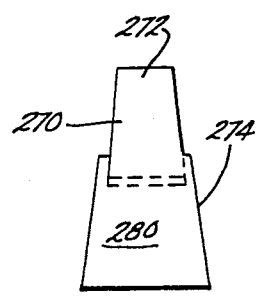
FIG. 25 is a rear elevation of the retaining leg shown in FIG. 24.

Provision is made to insure that the bracket will not slide downwardly from the button after installation. As seen in FIGS. 2, 15 and 16, the attachment means includes a pair of resilient leg elements 260. Leg elements 260 are disposed within complementary configured recesses 262 defined by the floor 202. Each recess is angled inwardly towards the longitudinal centerline 214 of floor area 202. Upstanding studs 264 are formed at the lower ends of the recesses. At the rear ends, the recesses are provided with stops 266 (FIG. 15). As best seen in FIGS. 24 and 25, each leg 260 includes an elongated portion 270 having a free end 272 and a base portion 274. Base portion 274 includes inwardly tapered front and back faces 276, 280, respectively. Faces 276, 280 taper inwardly to a narrow neck portion 282 which is integral with and joins leg 260 to the back flange. Neck 282 acts as a "living hinge" permitting the legs to rotate downwardly during assembly, as explained below. Since the legs are formed from a resilient material, they are inherently biased to an upstanding position, as illustrated in FIGS. 16 and 24.

Elongated portion 270 and base 274 are joined together to define a stop shoulder 286. Stop shoulder 286, as explained below, engages an upper or trailing end of the button. The legs function as a resilient retaining means to insure that the bracket is retained on the button after assembly.

It is presently preferred that the bracket be injection molded as a one-piece unit from a suitable acetal copolymer material. One such material is that sold under the brand name Celcon M-90 by Celanese Corporation. This material has a yield stress of 61 N/mm$^2$ and an elongation of 60 percent in accordance with ASTM Test Method D 638, Speed "B," and a flexural modulus of 2590 N/mm$^2$ and flexural stress at 5° deflection of 90 N/mm$^2$ in accordance with ASTM Test Method D 790. The notched impact (120 D) property in accordance with ASTM Test Method D 256 for this material is 1360 N mm/mm.

In the alternative, the bracket could be molded in two parts which are subsequently bonded together, or it could be made in a two-stage molding process so that separate materials could be employed. For Example, a glass-filled material could be employed for the main bracket body in order to obtain suitable vibration properties and an engineering thermoplastic could be employed for the attachment means 252,260 of the bracket.

In a presently existing embodiment of the bracket in accordance with the present invention, the main body has an overall width $w_1$ (FIG. 14) of approximately 35 mm, an overall height $h_1$ (FIG. 16) to the center of the ball 168 of approximately 34.6 mm. Each clip 216, 218 has a length $l_1$ (FIG. 15) of approximately 19 mm. Lip 226 of each clip 216, 218 has a transverse dimension $t_1$ (FIG. 16) of approximately 3 mm. The maximum thickness of the lip and the vertical sidewall 224 of the clip is approximately 1.45 mm. Each leg 260 has an overall length $l_2$ (FIG. 24) of approximately 7.44 mm. Portion 270 has a minimum thickness $t_2$ (FIG. 24) of approximately 0.24 mm. The leading portion of leg 260 is tapered at an angle of approximately 5°. The overall height $h_3$ (FIG. 24) of base 274 of each leg 260 is approximately 3.40 mm. Each of the V-guides 238, 240 has an overall height $h_4$ (FIG. 22) of 1.55 mm and an included angle of approximately 30°. Pivot and tension support member 132 has an overall length of 8 mm.

The basic dimensioning of the bracket main body and its angular configuration is determined by the geometric design constraints of existing vehicle windshields. The bracket is designed for "universal" application in vehicles of U.S. manufacture. Automobiles of U.S. manufacture have a windshield angle of inclination within the range of 31°-38°, a radius of curvature within the range of 5,000-7,000 mm and a vertical height from the base of the mirror glass at a nominal driving position to the base of the header of approximately 105-122 mm. Employing the "means" of these values, the basic bracket configuration or dimensioning thereof can be determined. The bracket is symmetrical about a nominal centerline extending down the center of the central flange 146 and is also symmetrical about a longitudinal centerline 214 extending down and through the center of the flanges 142, 144. The bracket is capable of relatively high volume manufacture at reduced costs when compared to the multi-piece brackets heretofore employed. The bracket is configured to the various windshield angles of inclination which can be encountered and readily provides a "breakaway" feature due to the resilient clips and tension and support pivot member. The bracket may be assembled from below the button and is therefore usable in vehicles wherein the button must be located close to the vehicle header.

BRACKET ALTERNATIVE EMBODIMENT

Figure 29:
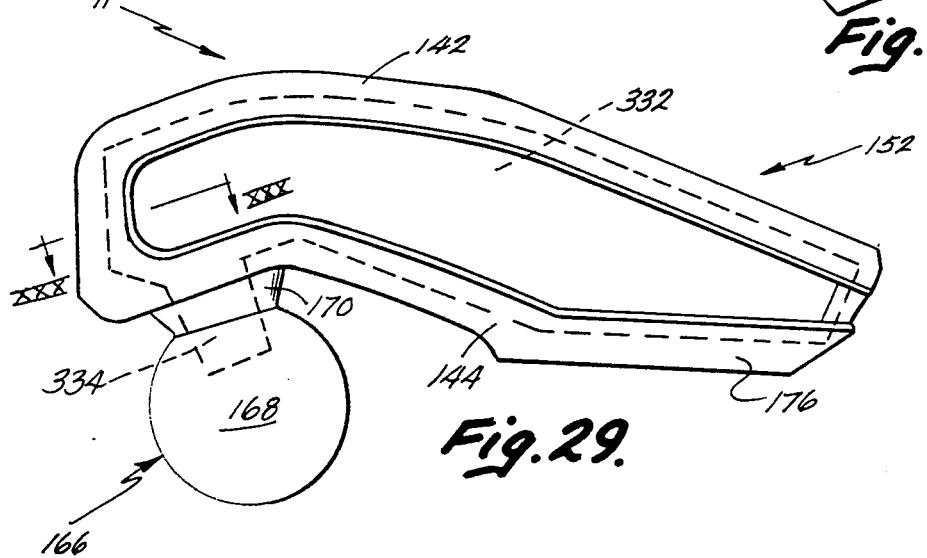
FIG. 29 is a side elevation of an alternative embodiment of the mirror support bracket of the present invention.
Figure 30:
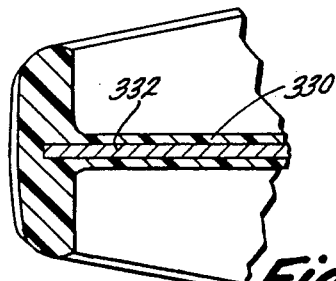
FIG. 30 is a fragmentary, sectional view of the alternative bracket taken generally aong plane XXX—XXX of FIG. 29.
Figure 31:
FIG. 31 is a perspective view of a rigid, stiffening insert included in the alternative embodiment of the bracket shown in FIGS. 29 and 30.

An alternative embodiment of the bracket is illustrated in FIGS. 29-31 and generally designated 11'. Bracket 11' differs from bracket 11 primarily in the elimination of the reinforcing ribs 184, 186, 188 and 190. Bracket 11' similarly includes a rear flange 142 and a front flange 144. Extending from and formed integral with front flange 144 is a mirror case mounting means 166 including the spherical ball 168 and neck 170. Front flange 144 includes a styling/logo area 176. Also, the bracket attachment means 152, as in the previous embodiment, is defined on the upper end of rear flange 142. The bracket 11' includes a central web 330. Therefore, bracket 11' has an I-beam configuration in cross section. Rigidity is provided by a metal, planar insert 332 (FIGS. 30 and 31). As shown, the insert 332 has a configuration which corresponds generally to the side elevation of the bracket body 11'. As seen in FIGS. 29 and 30, rigid metal insert 332 is disposed centrally within the central web 330. Insert 332 has a depending leg portion 334 which extends into the neck area 170 of mirror attachment 166. Bracket 11' is fabricated from the same preferred materials as bracket 11. The desired rigidity and vibration characteristics are obtained by molding the main body about the metal reinforcement insert 332.

ALTERNATIVE BRACKET ATTACHMENT MEANS

Figure 32:
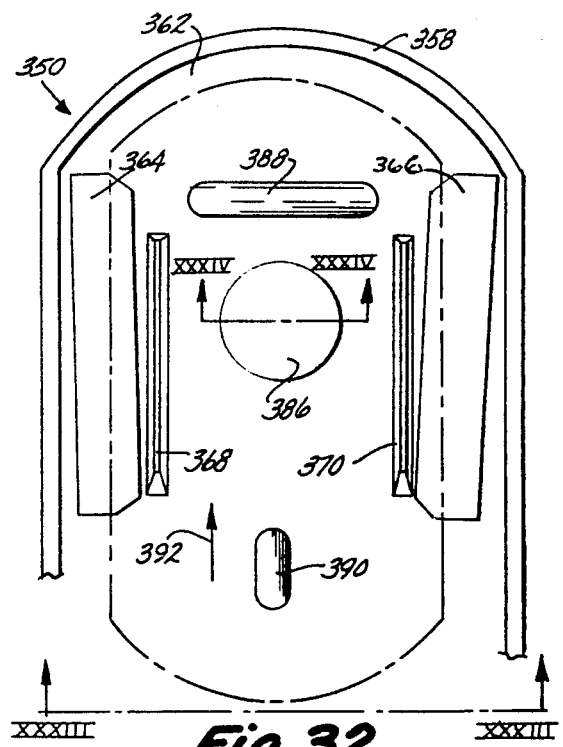
FIG. 32 is a rear elevation of an alternative attachment means in accordance with the present invention.
Figure 33:
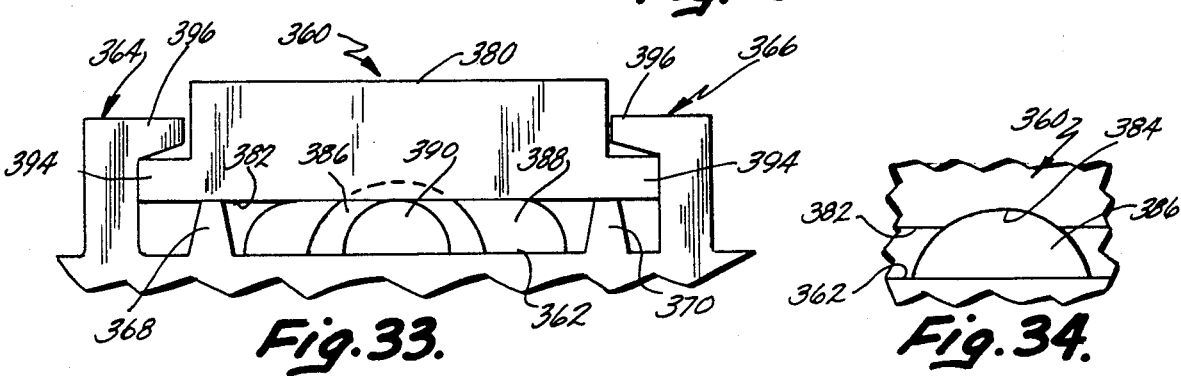
FIG. 33 is a fragmentary, end elevation of the alternative attachment means taken generally along plane XXXIII—XXXIII of FIG. 32.
Figure 34:
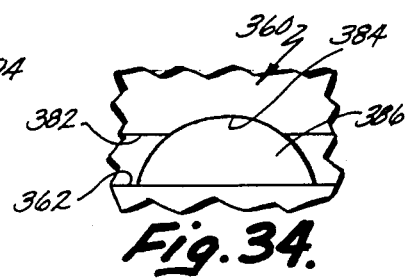
FIG. 34 is a sectional view of the alternative attachment means taken generally along plane XXXIV—XXXIV of FIG. 32.

An alternative bracket attachment means for use with either of the bracket main bodies is illustrated in FIGS. 32, 33 and 34. Attachment means 350 is formed integral with or joined to a back flange or other rear surface of the bracket main body. As illustrated, the attachment means includes a surrounding wall 352 having lateral sidewalls 355, 356 and a top end wall 358. Attachment means 350 is adapted to be slid onto a button shown in phantom in FIG. 32 and designated 360. Attachment 350 defines a planar member or floor surface 362. Positioned in opposed, spaced relationship are clips 364, 366. Clips 364, 366 are identical in configuration to clips 216, 218 of the embodiment illustrated in FIG. 15. Embodiment 350 includes elongated guides 368, 370 which are V-shaped in cross section. Guides 368, 370, as in the prior embodiment, extend immediately in front of the opposed grooves defined by the clips 364, 366. Attachment means 350 further includes a transversely extending tension member 388 and a longitudinally extending, perpendicularly related tension member 390. Tension members 388, 390 are oblong, half-cylindrical shaped members.

Attachment means 350 is adapted for use with a button 360 which, as seen in FIG. 33, includes a rear surface 380 which is attached to the windshield, and a front surface 382. As shown in FIG. 34, front surface 382 defines a sperical-shaped recess 384 which opens therethrough and cooperates with a semi-spherical, resilient member 386 extending from floor 362 of the attachment means. Member 386 positioned between clips 364, 366.

As seen in FIG. 24, when the button is inserted in the direction of arrow 392, front face 382 will be engaged by the V-guides 368, 370 and by tension and support members 388, 390. The outwardly extending flanges 394 of the button will be biased into engagement with the undersurface of the lips 396 of the clips 364, 366.

Members 388, 390 and the V-guides place the clips in tension so that the bracket is securely retained on the button. Semispherical member 386 functions as a retaining means and is received within the recess 384. Member 386 insures that the bracket is retained on the button in a detent fashion, and replaces the resilient legs 260 of the previous embodiment.

Attachment means 350 includes the same breakaway feature as the prior embodiment. When subjected to a load at a mirror case mounting means, the bracket will pivot or rotate about the pivot member or fulcrum 388 and the clips 364, 366 will bend outwardly and release from the button 360.

Figure 35:
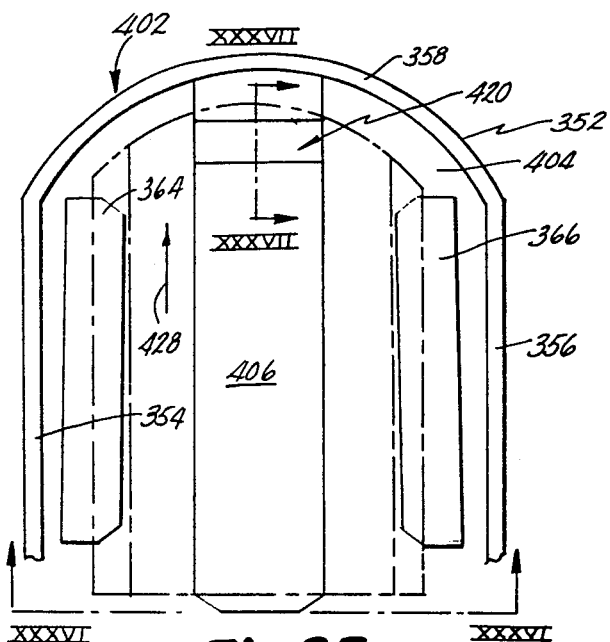
FIG. 35 is a rear elevation of a further alternative embodiment of an attachment means in accordance with the present invention.
Figures 36, 37:
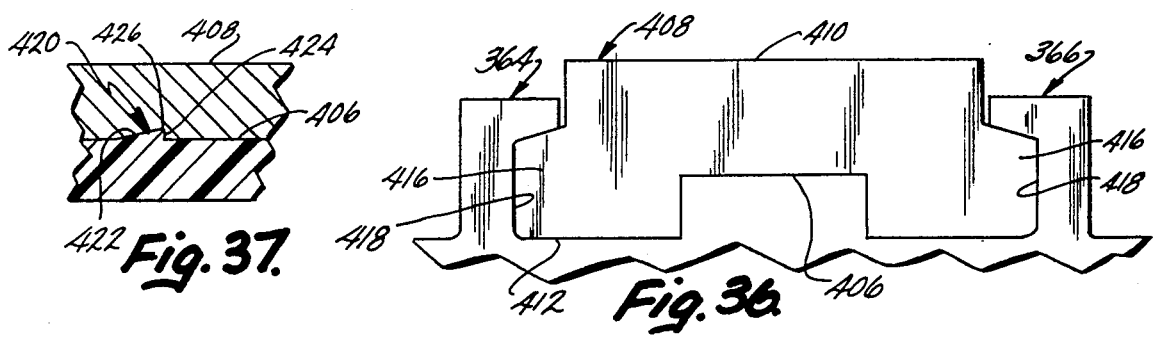
FIG. 36 is an end elevation of the further alternative attachment means taken generally along plane XXXVI—XXXVI of FIG. 35.
FIG. 37 is a sectional view of the further alternative attachment means taken generally along plane XXXVII—XXXVII of FIG. 35.

FIGS. 35, 36 and 37 illustrate a still further alternative embodiment of an attachment means in accordance with the present invention. The alternative attachment means, designated 402 in FIG. 35, includes a surrounding wall 352 having lateral sides 354, 356 and a lower end wall 358. Opposed, inwardly facing clips 364, 366 extend outwardly from the floor or planar area 404. As seen in the end view (FIG. 36), floor 404 defines a generally rectangularly configured, elongated guide 406.

Attachment means 402 is adapted for use with a button generally designated 408. Button 408 includes a rear surface 410 which is secured to the windshield and a front surface 412. Front surface 412 defines an elongated recess 414 which is rectangular in cross section and configured to receive elongated guide 406 defined by the attachment means. Button 408 also includes dovetail-shaped side flanges 416 which are received in opposed grooves 418 defined by clips 364, 366.

Bracket or attachment means 402 is retained on the button by a transversely extending, sloped ridge 420. As seen in FIG. 35, ridge 420 extends transversely of the center, longitudinally extending guide 406. Ridge 420 includes a top surface 422 and a front or stop surface 424. Button 408 is formed with a correspondingly or matingly configured recess 426.

When attachment means 402 is slid onto button 408, in the direction of arrow 428 (FIG. 35), recess 414 receives guide 406 and ridge 420 snaps into recess 426 in a detent fashion. Ridge 420, which is resilient, retains the bracket on the mounting button.

Embodiment 402 releases from the button in the same fashion as in the prior embodiments. When the bracket is impacted, it will pivot about detent ridge 420 which forms a fulcrum. Clips 364, 366 will expand and release from flanges 416 of button 408. Guide 406 is dimensioned to tension clips 364, 366 so that they are placed under an initial strain. This insures that the bracket will be securely held by the button and that suitable minimum vibration characteristics will be obtained.

Following assembly of the pivot actuator, mirror case and mirror element as described above, the spherical ball 168 of bracket 11 may be snapped into place within socket 70 of the pivot actuator 60. As will be understood from FIG. 4, the thickness of wall 71 of the socket 70 is sufficient to allow slight expansion for receipt of the ball member 168 without fracturing, yet maintain sufficient strength to properly frictionally retain the ball and, thus, the position of the case and pivot actuator on the ball, when in use even when subjected to vibration and road shocks in a vehicle. As shown in FIGS. 4 and 18, the egg-shaped configuration of the socket 70 provides contact between the ball member and the sides of the socket but not between the ball and the bottom of the socket. Preferably, at normal temperatures, the required torque or force to pivot the assembly of case 12 and actuator 60 about ball 168, based on such frictional interengagement, is in the range of approximately 5 to 30 pounds. This adjustment force is greater than the force or torque required to pivot tab 74 and thus move case 12 between its day and night positions. Adjustment of the mirror head assembly will therefore not affect the day/night positioning of the mirror. Further, the adjustment torque or force is also less than the breakaway force of brackets 11, 11' from their corresponding windshield buttons. Accordingly, adjustment of the mirror head will also not release the bracket from its mounting button. In addition, the angle of the conical neck 170 matches the angle of the lead-in conical surface 82 on socket 70 such that, when ball 168 is pivoted within the socket and neck 170 engages lead-in surface 82, the surfaces will be substantially parallel.

Assembly of the ball within socket 70 is facilitated by snap-in insertion of the ball within the 1 to 3 minute period in which the mirror element and pivot actuator are assembled within case 12 and are at a somewhat elevated temperature. Alternately, pivot actuator 60 may be heated or heat-soaked prior to assembly with ball member 168 thereby facilitating such assembly by the thermal expansion accompanying such heating. Thereafter, they may be allowed to shrink back to normal size to provide the proper frictional interengagement with the ball. The snap-in capability for socket 70 and ball 168 greatly reduces assembly time and eliminates numerous separate parts previously necessary for mounting a mirror head. The preferred combination of acetal resin for ball 168 and polypropylene homopolymer for socket 70 enables such assembly and provides the required frictional holding force thereafter over the temperature range of −40° to +190° F. Also, the assembly of the one-piece, resinous bracket, one-piece resinous case with flexible biasing portions, one-piece, resinous rigid pivot actuator, and glass prism mirror element provide superior vibrational resistance and stable support combined with safety breakaway capabilities necessary for current governmental and industry standards.

Figure 3:
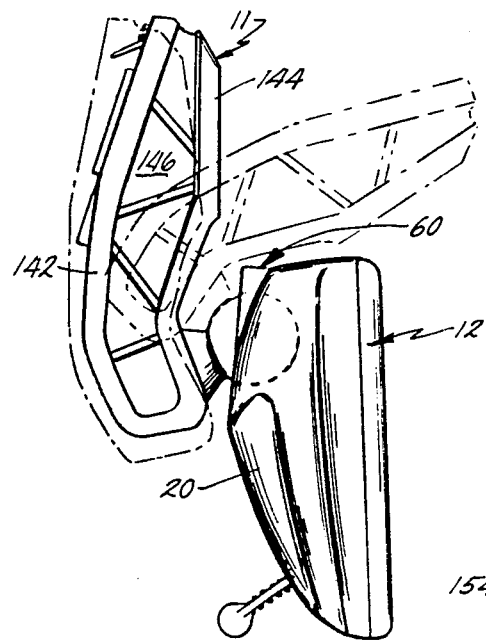
FIG. 3 is an end elevation of the rearview mirror assembly shown in FIGS. 1 and 2 illustrating the range of vertical adjustment of the mirror head assembly with respect to the support bracket.

As shown in FIG. 3, when the assembly of case 12 and actuator 60 is pivoted downwardly to its extreme position against the bottom of bracket 11, the assembly of case 12 and actuator 60 will normally be stopped by such engagement. However, if such pivoting occurs and further force or impact is applied to the front of the case urging its bottom portion rearwardly, the interengagement between the case and the bottom of the bracket 11 will provide a fulcrum allowing further pivotal action of the case with respect to the ball. When the force is sufficient, ball 168 will be cammed out of the socket 70, providing a further source for energy absorption and breakaway or collapse to prevent injury to a person striking the mirror during a collision or other impact.

BRACKET-MIRROR HEAD ASSEMBLY AND OPERATION

Figure 26:
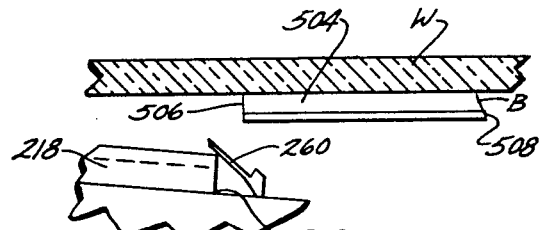
FIGS. 26-28 are fragmentary, side elevations showing the manner in which the bracket is installed on a windshield mounted button using a sliding motion.
Figure 27:
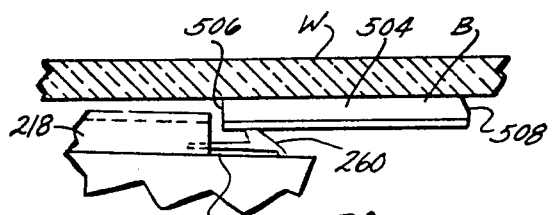
Figure 28:
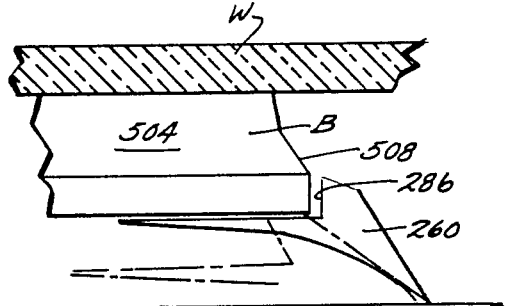

The assembly of the bracket in accordance with the present invention to a windshield button is illustrated in FIGS. 26, 27 and 28. As shown therein, a vehicle windshield "W" has secured thereto a mounting button "B." Button "B" is secured to the windshield in a conventional fashion, such as by suitable adhesives. Button "B" is a relatively rigid member and is of a configuration found on present Ford Motor Company passenger cars. The button may be fabricated from die cast metals or other materials having a coefficient of thermal expansion substantially the same as that of the windshield "W." Button "B" includes inwardly tapered, laterally extending sides 504. End 506 of the button is facing towards the dash of the vehicle and end 508 is facing towards the vehicle header. End 506 is wider than end 508.

To assemble the bracket 11, 11' onto button "B," the bracket is initially positioned below the button "B" and the leading edge 506 of the button is located at the entry end to the clips 218, 216 (FIG. 26). The bracket is then pushed upwardly towards the vehicle header. The button will depress or pivot the legs 260 downwardly towards floor area 202. The legs will pivot until free ends 272 of portions 270 engage upstanding studs 264 in recesses 262. The wide end 506 of the button will force clips 216, 218 outwardly initially since this end enters the clips at their narrowest width. This initial strain on the clips is eliminated after assembly is completed.

As the bracket is pushed in, V-guides 238, 240 engage button "B" and prevent interference between the button and the floor of the attachment means. Contact is made between the button and resilient support elements 232, 234. The bracket is pushed upwardly until the button is engaged by portion 210 of surrounding wall 204. The bracket is now in the position shown in FIG. 28. In this position, the legs 260 have sufficient clearance to rotate in a clockwise direction, as seen in FIG. 28, to clear the top end 508 of the button "B". The stop shoulders 286 of the legs prevent the bracket from shifting downwardly and off the button after assembly. If the bracket is pulled downwardly with an excessive force, the legs 260 may break at their bases of hinge portions 282. The legs would detach and move against stops 266 in recessed areas 262. The legs would be "trapped" between the stops 266 and the button "B" to prevent complete removal without depression of the legs as occurred during installation.

If the mirror case receives an impact of a predetermined magnitude, the bracket will separate or break away from the mounting button "B". Since the spherical ball 168 is positioned at an angle with and below the attachment means, a moment arm exists between the ball and pivot and support member 232. With the force being applied to the ball, member 232 acts as a pivot or fulcrum and the bracket rotates clockwise about this member. The resilient clips 216, 218 spread apart until they separate from button "B." The bracket will therefore "break away" from the support button without breakage of the bracket main body.

In view of the foregoing description, those of ordinary skill in the art will undoubtedly envision various modifications which will not depart from the inventive concepts disclosed herein. For example, the mirror case mounting means which is illustrated in the form of a spherical ball could be eliminated. A socket could be formed as part of or added to the front flange of the body and the ball defined by the mirror case assembly. The specific attachment means which have been illustrated could be employed with a main body other than the I-beam configuration expressly illustrated.

Accordingly, the present invention provides a simplified, highly reliable rearview mirror assembly which provides requisite strength with lightness, fewer overall parts compared to prior known mirror assemblies, simplified assembly procedures coupled with consequent reduction in rejection rates for the assemblies, and more positive control of day/night pivoting action. In addition, the assembly is adapted to meet safety requirements for major vehicle producing countries. Further, the unique mirror support bracket in accordance with the present invention provides the manufacturer with a bracket which is "universally" adaptable to the various vehicle windshield angles and curvatures. The bracket provides a unique breakaway feature yet insures that it will be stably held without annoying vibration. The resilient clips and tension and support members incorporated in each of the attachment means accomplish this result. Further, the bracket is readily secured to the button from below in a simple fashion. This eliminates problems caused by insufficient clearance between the button and a vehicle header. The bracket, case and pivot actuator may each be relatively inexpensively manufactured as a single, one-piece injection molded members. This eliminates the numerous additional parts heretofore employed in interior rearview mirror assemblies. The assembly is, however, esthetically pleasing and additional covering caps need not be employed.

While several forms of the invention have been shown and described, other forms will now be apparent to those skilled in the art. Therefore, it will be understood that the embodiment shown in the drawings and described above are merely for illustrative purposes, and are not intended to limit the scope of the invention which is defined by the claims which follow.

The embodiments of the invention in which an exclusive property or privilege is claimed are defined as follows:

1. A breakaway rearview mirror assembly adapted to be slidably mounted on a button secured to a vehicle windshield, said mirror assembly comprising:
   a breakaway rearview mirror bracket, said bracket including:
   a one-piece body defining a front surface, a rear surface, a top end and a buttom end;
   a pair of resilient, opposed, elongated clips which define grooves dimensioned to receive the button in a tongue and groove fashion;
   a pivot and tension member positioned on said rear surface in between said clips, said pivot and tension member dimensioned to tension the clips after receipt of the button by engaging the button and urging it against said clips to securely locate the bracket on the button, said member including means forming a breakaway pivot positioned closer to one end of said clips than the other for pivoting said bracket about the button when the mirror assembly sustains a predetermined impact;

a mirror head assembly including a mirror case having a rear surface and a mirror carried by said mirror case; and mirror mounting means forming a part of said bracket and said head assembly for adjustably mounting said mirror case to said bracket.

2. A breakaway rearview mirror assembly adapted to be slidably mounted on a button secured to a vehicle windshield, said mirror assembly comprising:

a breakaway rearview mirror bracket, said bracket including:

a one-piece body defining a front surface, a rear surface, a top end and a bottom end;

a pair of resilient, opposed, elongated clips which define grooves dimensioned to receive the button in a tongue and groove fashion;

a pivot and tension member positioned on said rear surface in between said clips, said pivot and tension member dimensioned to tension the clips after receipt of the button to securely locate the bracket on the button and to act as a pivot about which the bracket rotates when the mirror assembly sustains a predetermined inpact;

a mirror head assembly including a mirror case having a rear surface and a mirror carried by said mirror case; and mirror mounting means forming a part of said bracket and said head assembly for adjustably mounting said mirror case to said bracket;

said one-piece body of said mirror bracket having an I-beam configuration in cross section and including a central web, a front flange and a rear flange extending along said web, said clips being formed integrally with said rear flange adjacent the top end of said body.

3. A breakaway rearview mirror assembly as defined by claim 2 further including a planar, rigid reinforcing member which extends along and between said flanges and which is disposed within said central web.

4. A breakaway rearview mirror assembly as defined by claim 2 further including a plurality of angularly related ribs, each rib extending between said front and rear flanges to rigidify and reduce vibration of said body.

5. A breakaway rearview mirror assembly as defined by claim 2 wherein said body further includes:

a wall which surrounds said clips and defines an open end for receipt of the windshield button, said wall acting as a stop to limit movement of said attachment means onto said button during installation.

6. A breakaway rearview mirror assembly as defined by claim 5 wherein said body further includes:

resilient retaining means adjacent said clips for engaging and retaining said body on said button after said clips have received the button.

7. A breakaway rearview mirror assembly as defined by claim 6 wherein said resilient retaining means comprises:

an integral, resilient, semi-spherical member which engages the button and tensions the clips.

8. A breakaway rearview mirror assembly as defined by claim 6 wherein said retaining means comprises:

a sloped detent ridge which extends transversely of said back flange; said attachment means further including an elongated guide extending longitudinally of said rear flange and dimensioned to be received in a complementarily configured groove defined by the button.

9. A breakaway rearview mirror assembly as defined by claim 6 further including a plurality of angularly related ribs, each extending between said front and rear flanges to reduce vibration of said body.

10. A breakaway rearview mirror assembly as defined by claim 9 wherein said mirror mounting means comprises:

a neck integral with said front flange and extending outwardly therefrom;

a spherical ball integral with said neck; and socket means supported by said mirror case for receiving said spherical ball.

11. A breakaway rearview mirror assembly as defined in claim 10 wherein said socket means is in one piece and formed from resinous, thermoplastic material;

said bracket, including said neck and ball, also being formed from a resinous, thermoplastic material; said socket means having a thickness sufficient to allow said ball to be snapped thereinto without fracturing, maintain sufficient frictional interengagement with said ball to hold said mirror head assembly in a desired position in use yet allow cammed release of said ball when forced beyond the limit of its universal pivotal movement; said socket means extending over more than one-half of the surface area of said ball.

12. A breakaway rearview mirror assembly as defined in claim 11 wherein said socket means is formed from a polypropylene homopolymer; said bracket including said neck and ball being formed from an acetal resin.

13. A breakaway rearview mirror assembly as defined by claim 6 further including a planar, rigid reinforcement plate within said central web.

14. A breakaway rearview mirror assembly as defined in claim 1 wherein said mirror mounting means comprises:

a neck integral with said front surface and extending outwardly therefrom;

a spherical ball integral with said neck; and socket means supported by said mirror case for receiving said spherical ball.

15. A breakaway rearview mirror assembly as defined in claim 14 wherein said socket means includes a conical lead-in surface; said neck including a conical member; said conical lead-in surface and neck being inclined at a matching angle such that they form matching pivot limiting abutment surfaces for one another.

16. A breakaway rearview mirror assembly as defined in claim 1, said mirror case having flexible, resilient portions and formed in one piece from a resinous material, and rigid actuator means for moving said case between day and night positions;

said case having a back, a continuous peripheral side wall adapted to outline the peripheral edge of said mirror, retaining means for retaining said mirror in said case, and support means for supporting said actuator means within said case;

said actuator means including a portion of said mirror mounting means and pivot means for pivoting said actuator and case between said positions;

said case biasing said actuator means toward one or the other of said positions such that a predetermined force is required to pivot said actuator means and case with said pivot means.

17. The rearview mirror assembly of claim 16 wherein said case back curves outwardly to an area of maximum overall case depth to facilitate flexing of said case during use of said pivot means.

18. The rearview mirror assembly of claim 17 wherein said case back curves outwardly both transversely across and longitudinally along said case.

19. The rearview mirror assembly of claim 18 wherein said case includes top and bottom corners between said top and bottom side wall portions and said case back; said case including a pair of apertures extending through said top and bottom corners generally midway between said ends, one of said apertures extending through said top corner and the other through said bottom corner; said area of maximum overall case depth including a line defining said maximum case depth extending intermediate said apertures and immediately adjacent said aperture through said top corner; said mounting means projecting through said top corner aperture; said pivot means projecting through said bottom corner aperture.

20. The rearview mirror assembly of claim 16 wherein said retaining means includes a lip extending along said continuous peripheral side wall and inwardly toward the center of said case, said lip adapted to allow snap-in insertion of said mirror into said case.

21. The rearview mirror assembly of claim 16 wherein said continuous side wall includes portions defining a top, a bottom, and ends of said case; said support means including a pair of inwardly projecting, pivot actuator support walls spaced apart on the interior surface of said mirror case and extending across the interior of said case between said top and bottom, and spaced pivot supports in that area between said support walls for receiving actuator means.

22. The rearview mirror assembly of claim 21 wherein said actuator means include a pair of spaced pivot axles received in said spaced pivot supports, rigid body means for holding said axles apart at a predetermined spacing and being substantially rigid and inflexible between said pivot supports and axles, and at least one pivot limiting tab extending from said rigid body means for limiting movement between said two positions; at least one of said support walls including an aperture therethrough receiving said pivot limiting tab.

23. The rearview mirror assembly of claim 22 wherein said rigid body means is V-shaped and includes a pair of diverging legs extending between said pair of pivot axles.

24. The mirror assembly of claim 23 wherein said diverging legs lie in a common plane including one of said pivot axles; said mounting means extending at an angle to said plane of said diverging legs.

25. The rearview mirror assembly of claim 22 including a pair of said pivot limiting tabs, one tab on each side of said rigid body means; each of said tabs including a plurality of facets extending at different angles; one of said facets providing an inclined surface facilitating assembly of said actuator means in said support means; another pair of said facets providing spaced pivot limiting abutment surfaces.

26. The rearview mirror assembly of claim 22 wherein said pivot means includes over-center hinge means having one of said pair of pivot axles for moving said actuator means, and flexible connection means for pivotally connecting said one pivot axle to said rigid body means, and a pivot tab fixedly connected to said one pivot axle for pivoting said one pivot axle, and thus, said entire pivot actuator means.

27. The rearview mirror assembly of claim 21 wherein said case includes at least one support rib extending between said actuator support walls on the inside surface of said case.

28. The rearview mirror assembly of claim 27 wherein said spaced pivot supports are spaced slightly closer together than are said pivot axles whereby, when said actuator means is received in said pivot supports, said case is slightly flexed and requires a predetermined force to pivot said pivot means to move said case between said two positions.

29. The rearview mirror assembly of claim 16 wherein said mirror mounting means includes socket means on said actuator means for receiving a ball member; said bracket including an outwardly extending neck and a spherical ball integral with said neck; said ball being received in said socket means and providing pivotal adjustment of said mirror head assembly with respect to said bracket.

30. An inside rearview mirror assembly for vehicles adapted to be mounted on a button on a vehicle windshield comprising:
a breakaway support bracket having an integral body with an I-beam configuration in cross section, a central web, a front flange and a rear flange extending along said web, said flanges each including top and bottom ends, and breakaway bracket attachment means on said rear flange adjacent its top end for attaching said body to a windshield button;
a mirror head assembly including a mirror case having a rear surface and a mirror element carried by said mirror case;
mirror mounting means forming a part of said bracket and said head assembly for adjustably mounting said mirror case to said bracket; and
said bracket attachment means adapted to release from the windshield button when said head assembly is struck with a predetermined force.

31. A bracket as defined by claim 30 wherein said front flange adjacent its top end defines a recess which boarders a styling/logo area to which styling trims and logos may be applied.

32. A bracket as defined by claim 30 wherein said bracket attachment means comprises:
a pair of opposed, longitudinally extending and transversely spaced clips which are joined to said rear flange, said clips each having a general L-shape in cross section to define a groove for receipt of the windshield button, said clips being resilient so as to break away from said button to release said bracket when an impact of predetermined magnitude impacts said mirror case mounting means.

33. A bracket as defined by claim 32 wherein said bracket attachment means further includes:
a wall which surrounds said clips and defines an open end for receipt of the windshield button, said wall acting as a stop to limit movement of said attachment means onto said button during installation.

34. A bracket as defined by claim 33 wherein said bracket attachment means further includes:
a resilient pivot member disposed generally along the longitudinal centerline of said rear flange and adjacent said clip means, said pivot member dimensioned to engage the button and tension said clips and to serve as a pivot point about which said bracket may pivot when impacted.

35. A bracket as defined by claim 34 wherein each of said clips includes a sidewall and an inwardly directed lip, said lip having an under surface which is sloped downwardly towards said sidewall.

36. A bracket as defined by claim 35 wherein said bracket attachment means further includes:
    resilient retaining means adjacent said clips for engaging and retaining said body of said button after said clips have received the button.

37. A bracket as defined by claim 36 wherein said resilient retaining means comprises:
    an integral, resilient, semi-spherical member which engages the button and tensions the clips and wherein said surrounding wall opens towards the bottom end of said body.

38. A bracket as defined by claim 36 wherein said resilient retaining means comprises:
    a sloped detent ridge which extends transversely of said rear flange; said attachment means further including an elongated guide extending longitudinally of said rear flange and dimensioned to be received in a complementarily configured groove defined by the button.

39. A bracket as defined by claim 36 or claim 37 wherein said bracket attachment means further includes:
    a pair of transversely spaced, longitudinally extending guides, each having a generally V-shape in cross section, said guides dimensioned to prevent a leading edge of the button from catching on the attachment means as the clips are slid over the button.

40. A bracket as defined by claim 30 further including a plurality of angularly related ribs, each extending between said front and rear flanges to reduce vibration of said body.

41. A bracket as defined by claim 39 wherein said flanges extend symmetrically about said central web.

42. A bracket as defined by claim 30 or claim 36 further including a planar, rigid reinforcing member which extends along and between said flanges and which is disposed within said central web.

43. A bracket as defined by claim 42 wherein said reinforcing member is a metal plate.

44. A bracket as defined by claim 43 wherein said mirror case mounting means comprises:
    a spherical ball; and
    a neck joining said ball to said front flange adjacent its bottom end.

45. The rearview mirror assembly of claim 30 further including a plurality of angularly related ribs, each rib extending between said front and rear flanges to reduce vibration of said body.

46. The rearview mirror assembly of claim 45 or claim 30 wherein said mirror case has flexible, resilient portions and is formed in one piece from a resinous material; and rigid actuator means for moving said case between day and night portions;
    said case having a back, a continuous peripheral side wall adapted to outline the peripheral edge of said mirror retaining means for retaining said mirror in said case, and support means for supporting said actuator means within said case;
    said actuator means including mounting means for mounting a bracket for securing said assembly on a support and pivot means for pivoting said actuator and case between said positions;
    said case biasing said actuator means toward one or the other of said positions such that a predetermined force is required to pivot said actuator means and case with said pivot means.

47. The rearview mirror assembly of claim 46 wherein said retaining means includes a lip extending along said continuous peripheral side wall and inwardly toward the center of said case, said lip adapted to allow snap-in insertion of said mirror into said case.

48. The rearview mirror assembly of claim 46 wherein said continuous side wall includes portions defining a top, a bottom, and ends of said case; said support means including a pair of inwardly projecting, pivot actuator support walls spaced apart on the interior surface of said mirror case and extending across the interior of said case between said top and bottom, and spaced pivot supports in that area between said support walls for receiving actuator means.

49. The rearview mirror assembly of claim 48 wherein said case includes at least one support rib extending between said actuator support walls on the inside surface of said case.

50. The rearview mirror assembly of claim 48 wherein said actuator means include a pair of spaced pivot axles received in said spaced pivot supports, rigid body means for holding said axles apart at a predetermined spacing and being substantially rigid and inflexible between said pivot supports and axles, and at least one pivot limiting tab extending from said rigid body means for limiting movement between said two positions; at least one of said support walls including an aperture therethrough receiving said pivot limiting tab.

51. The rearview mirror assembly of claim 50 wherein said spaced pivot supports are spaced slightly closer together than are said pivot axles whereby, when said actuator means is received in said pivot supports, said case is slightly flexed and requires a predetermined force to pivot said pivot means to move said case between said two positions.

52. The rearview mirror assembly of claim 51 including a pair of said pivot limiting tabs, one tab on each side of said rigid body means; each of said tabs including a plurality of facets extending at different angles; one of said facets providing an inclined surface facilitating assembly of said actuator means in said support means; another pair of said facets providing spaced pivot limiting abutment surfaces.

53. The rearview mirror assembly of claim 50 wherein said pivot means includes over-center hinge means having one of said pair of pivot axles for moving said actuator means, and flexible connection means for pivotally connecting said one pivot axle to said rigid body means, and a pivot tab fixedly connected to said one pivot axle for pivoting said one pivot axle, and thus, said entire pivot actuator means.

54. The rearview mirror assembly of claim 46 wherein said mirror mounting means includes socket means on said actuator means for receiving a ball member; said bracket including an outwardly extending neck and a spherical ball integral with said neck; said ball being received in said socket means and providing pivotal adjustment of said mirror head assembly with respect to said bracket.

55. In a day/night rearview mirror assembly for vehicles including a mirror case and a pivot actuator, said case being formed in one piece from a resinous material and having a back, a continuous peripheral side wall adapted to outline the peripheral edge of a mirror element, and support means for supporting said pivot actuator within said case, said pivot actuator having mounting means for mounting a bracket for securing said assembly on a support and pivot means for pivoting said actuator and case between at least two different positions with respect to said mounting means, the improvement comprising:

said molded case including flexible, resilient portions and having a preformed lip on said continuous peripheral side wall for retaining a mirror element within said case; said pivot actuator being substantially rigid; said case portions being sufficiently flexible and resilient to bias said actuator toward one or the other of said actuator positions; said support means supporting said actuator in a prestressed position when assembled in said case while said lip extends inwardly a distance sufficient such that when a mirror element is received within said case, and said actuator is pivoted with said pivot means, said case will flex with respect to said rigid actuator to allow the pivotal movement while said lip will continue to cover the edge of the mirror element and a predetermined portion of the mirror element spaced inwardly from the edge thereof regardless of the flexing action of said case and said lip during such pivoting; and a one-piece, breakaway, rearview mirror support bracket including breakaway bracket attachment means for attaching said bracket to a button secured to a windshield but releasing said and assembly upon the application of a predetermined force; said breakaway attachment means including a pair of resilient, opposed, elongated clips on a surface of said bracket, said clips defining grooves dimensioned to receive the button in a tongue and groove fashion; a pivot and tension member positioned on said rear surface in between said clips, said pivot and tension member dimensioned to tension the clips after receipt of the button by engaging the button and urging it against said clips to securely locate the bracket on the button, said member including means forming a breakaway pivot positioned closer to one end of said clips than the other for pivoting said bracket about the button when the mirror assembly sustains a predetermined impact; and means for cooperating with said mounting means to adjustably mount said mirror case and pivot actuator to said bracket.

56. The rearview mirror assembly of claim 55 wherein said assembly includes a mirror element; said continuous side wall including portions defining a top, a bottom, and ends of said case; said case including upstanding supports on the interior surface thereof at the ends of said case for supporting said mirror element immediately beneath said lip on said continuous side wall.

57. The rearview mirror assembly of claim 56 wherein said mirror element is a prism mirror element inserted between said lip and said upstanding supports within said case; said prism mirror element having nonparallel, planar, front and back surfaces, a coating of reflective material on at least one of said surfaces, and a layer of flexible, resilient material bonded to said back surface to retain any fragments should the mirror element be broken.

58. The rearview mirror assembly of claim 55 or claim 56 wherein said continuous side wall includes portions defining a top, a bottom, and ends of said case; said support means including a pair of inwardly projecting, pivot actuator support walls spaced apart on the interior surface of said mirror case and extending across the interior of said case between said top and bottom.

59. The rearview mirror assembly of claim 58 wherein said case includes at least one support rib extending between said actuator support walls on the inside surface of said case.

60. The rearview mirror assembly of claim 59 wherein said support means further include spaced pivot supports in the area between said support walls for receiving said pivot actuator.

61. The rearview mirror assembly of claim 60 wherein said pivot actuator includes a pair of spaced pivot axles received in said spaced pivot supports, rigid body means for holding said axles apart at a predetermined spacing and being substantially rigid and inflexible between said pivot supports and axles, and at least one pivot limiting tab extending from said rigid body means for limiting movement between said two positions; at least one of said support walls including an aperture therethrough receiving said pivot limiting tab.

62. The rearview mirror assembly of claim 61 wherein said spaced pivot supports are spaced closer together than are said pivot axles whereby, when said pivot actuator is received in said pivot supports, said case is slightly flexed and requires a predetermined force to pivot said pivot means to move said case between said two positions.

63. The rearview mirror assembly of claim 61 wherein said rigid body means is V-shaped and includes a pair of diverging legs extending between said pair of pivot axles.

64. The rearview mirror assembly of claim 61 wherein said pivot means includes over-center hinge means having one of said pair of pivot axles for moving said actuator and case, flexible connection means for pivotally connecting said one pivot axle to said rigid body means, and a pivot tab fixedly connected to said one pivot axle for pivoting said one pivot axle, and thus, said entire pivot actuator.

65. The rearview mirror assembly of claim 61 wherein said pivot actuator is molded from resinous material; said mounting means including a socket extending at an angle to the plane including said pair of pivot axles and molded integrally with one of said pivot axles and said rigid body means; said means for cooperating with said mounting means including a neck integral with said bottom end of said bracket and extending outwardly therefrom and a spherical ball integral with said neck and received in said socket to provide universal, pivotal adjustment of said case, actuator and mirror element assembly with respect to said bracket.

66. In a day/night rearview mirror assembly for vehicles including a mirror case and a pivot actuator, said case being formed in one piece from a resinous material and having a back, a continuous peripheral side wall adapted to outline the peripheral edge of a mirror element, and support means for supporting said pivot actuator within said case, said pivot actuator having mounting means for mounting a bracket for securing said assembly on a support and pivot means for pivoting said actuator and case between at least two different positions with respect to said mounting means, the improvement comprising:

said molded case including flexible, resilient portions and having a preformed lip on said continuous peripheral side wall for retaining a mirror element within said case; said pivot actuator being substantially rigid; said case portions being sufficiently flexible and resilient to bias said actuator toward one or the other of said actuator positions; said lip extending inwardly a distance sufficient such that when a mirror element is received within said case, and said actuator is pivoted with said pivot means, said lip will continue to cover the edge of the mirror element and a predetermined portion of the mirror element spaced inwardly from the edge thereof regardless of the flexing action of said case and said lip during such pivoting; and a one-piece, breakaway, rearview mirror support bracket including breakaway bracket attachment means for attaching said bracket to a button secured to a windshield but releasing said bracket and assembly upon the application of a predetermined force; and means for cooperating with said mounting means to adjustably mount said mirror case and pivot actuator to said bracket;

said continuous side wall including portions defining a top, a bottom, and ends of said case; said support means including a pair of inwardly projecting, pivot actuator support walls spaced apart on the interior surface of said mirror case and extending across the interior of said case between said top and bottom;

said case including at least one support rib extending between said actuator support walls on the inside surface of said case;

said support means further including spaced pivot supports in the area between said support walls for receiving said pivot actuator;

said pivot actuator including a pair of spaced pivot axles received in said spaced pivot supports, rigid body means for holding said axles apart at a predetermined spacing and being substantially rigid and inflexible between said pivot supports and axles, and at least one pivot limiting tab extending from said rigid body means for limiting movement between said two positions; at least one of said support walls including an aperture therethrough receiving said pivot limiting tab;

said bracket including a one-piece body defining a front surface, a rear surface, a top end and a bottom end;

a pair of resilient, opposed, elongated clips which define grooves dimensioned to receive the button in a tongue and groove fashion;

a pivot and tension member positioned on said rear surface in between said clips, said pivot and tension member dimensioned to tension the clips after receipt of the button to securely locate the bracket on the button and to act as a pivot about which the bracket rotates when the mirror assembly sustains a predetermined impact;

said one-piece body of said mirror bracket having an I-beam configuration in cross section and including a central web, a front flange and a rear flange extending along said web, said clips being formed integrally with said rear flange adjacent the top end of said body.

67. The rearview mirror assembly as defined by claim 66 further including a plurality of angularly related ribs, each rib extending between said front and rear flanges to rigidify and reduce vibration of said body.

68. The rearview mirror assembly as defined by claim 66 wherein said body further includes:
a wall which surrounds said clips and defines an open end for receipt of the windshield button, said wall acting as a stop to limit movement of said attachment means onto said button during installation.

69. The rearview mirror assembly as defined by claim 68 wherein said body further includes:
resilient retaining means adjacent said clips for engaging and retaining said body on said button after said clips have received the button.

70. The rearview mirror assembly as defined by claim 69 wherein said body further includes:
a pair of transversely spaced, longitudinally extending guides, each having a generally V-shape in cross section.

71. In a day/night rearview mirror assembly for vehicles including a mirror case and a pivot actuator, said case being formed in one-piece from a resinous material and having a back, a continuous peripheral side wall adapted to outline the peripheral edge of a mirror element, and support means for supporting said pivot actuator within said case, said pivot actuator having mounting means for mounting a bracket for securing said assembly on a support and pivot means for pivoting said actuator and case between at least two different positions with respect to said mounting means, the improvement comprising:

said molded case including flexible, resilient portions and having a preformed lip on said continuous peripheral side wall for retaining a mirror element within said case; said pivot actuator being substantially rigid; said case portions being sufficiently flexible and resilient to bias said actuator toward one or the other of said actuator positions; said lip extending inwardly a distance sufficient such that when a mirror element is received within said case, and said actuator is pivoted with said pivot means, said lip will continue to cover the edge of the mirror element and a predetermined portion of the mirror element spaced inwardly from the edge thereof regardless of the flexing action of said case and said lip during such pivoting; and a one-piece, breakaway, rearview mirror support bracket including breakaway bracket attachment means for attaching said bracket to a button secured to a windshield but releasing said bracket and assembly upon the application of a predetermined force; and means for cooperating with said mounting means to adjustably mount said mirror case and pivot actuator to said bracket;

said assembly including a mirror element; said continuous side wall including portions defining a top, a bottom, and ends of said case; said case including upstanding supports on the interior surface thereof at the ends of said case for supporting said mirror element immediately beneath said lip on said continuous side wall;

said support means including a pair of inwardly projecting, pivot actuator support walls spaced apart on the interior surface of said mirror case and extending across the interior of said case between said top and bottom;

said case includes at least one support rib extending between said actuator support walls on the inside surface of said case;

said support means further including spaced pivot supports in the area between said support walls for receiving said pivot actuator;

said pivot actuator including a pair of spaced pivot axles received in said spaced pivot supports, rigid body means for holding said axles apart at a predetermined spacing and being substantially rigid and inflexible between said pivot supports and axles, and at least one pivot limiting tab extending from said rigid body means for limiting movement between said two positions; at least one of said support walls including an aperture therethrough receiving said pivot limiting tab;

said bracket including a one-piece body defining a front surface, a rear surface, a top end and a bottom end;

a pair of resilient, opposed, elongated clips which define grooves dimensioned to receive the button in a tongue and groove fashion;

a pivot and tension member positioned on said rear surface in between said clips, said pivot and tension member dimensioned to tension the clips after receipt of the button to securely locate the bracket on the button and to act as a pivot about which the bracket rotates when the mirror assembly sustains a predetermined impact;

said one-piece body of said mirror bracket having an I-beam configuration in cross section and including a central web, a front flange and a rear flange extending along said web, said clips being formed integrally with said rear flange adjacent the top end of said body.

* * * * *